US 7,805,552 B2

(12) United States Patent
Au et al.

(10) Patent No.: US 7,805,552 B2
(45) Date of Patent: Sep. 28, 2010

(54) PARTIAL PACKET WRITE AND WRITE DATA FILTERING IN A MULTI-QUEUE FIRST-IN FIRST-OUT MEMORY SYSTEM

(75) Inventors: Mario Au, Fremont, CA (US); Jason Z. Mo, Fremont, CA (US); Hui Su, San Jose, CA (US)

(73) Assignee: Integrated Device Technology, Inc., San Jose, CA (US)

(*) Notice: Subject to any disclaimer, the term of this patent is extended or adjusted under 35 U.S.C. 154(b) by 1650 days.

(21) Appl. No.: 11/040,896

(22) Filed: Jan. 21, 2005

(65) Prior Publication Data

US 2006/0020761 A1 Jan. 26, 2006

Related U.S. Application Data

(60) Provisional application No. 60/591,499, filed on Jul. 26, 2004, provisional application No. 60/600,347, filed on Aug. 9, 2004.

(51) Int. Cl.
G06F 13/00 (2006.01)
G06F 3/00 (2006.01)
G06F 5/00 (2006.01)
(52) U.S. Cl. .............................. 710/55; 710/33; 710/52
(58) Field of Classification Search .................. 710/1, 710/33, 34, 52–57
See application file for complete search history.

(56) References Cited

U.S. PATENT DOCUMENTS

| 4,486,854 | A | 12/1984 | Yuni |
| 4,873,666 | A | 10/1989 | Lefebvre et al. |
| 4,888,739 | A | 12/1989 | Frederick et al. |
| 5,079,693 | A | 1/1992 | Miller |
| 5,084,891 | A | 1/1992 | Ariyavisitakul et al. |
| 5,506,809 | A | 4/1996 | Csoppenszkey et al. |
| 5,508,679 | A | 4/1996 | McClure |
| 5,600,820 | A | 2/1997 | Johnston |
| 6,044,418 | A | 3/2000 | Muller |
| 6,145,061 | A | 11/2000 | Garcia et al. |
| 6,304,936 | B1 | 10/2001 | Sherlock |
| 6,525,980 | B1 | 2/2003 | Au et al. |
| 6,678,759 | B2 | 1/2004 | Stockton et al. |
| 6,745,264 | B1 | 6/2004 | Luke et al. |
| 6,757,679 | B1 | 6/2004 | Fritz |
| 6,795,360 | B2 | 9/2004 | Duh et al. |
| 6,907,479 | B2* | 6/2005 | Karnstedt et al. ............. 710/52 |
| 6,947,437 | B1 | 9/2005 | Erimli et al. |
| 7,093,037 | B2 | 8/2006 | Duckman |
| 7,286,565 | B1* | 10/2007 | Carr ........................... 370/474 |
| 2002/0080672 | A1 | 6/2002 | Lee et al. |
| 2003/0018862 | A1 | 1/2003 | Karnstedt et al. |
| 2003/0034797 | A1 | 2/2003 | Bentz |
| 2003/0120842 | A1 | 6/2003 | Bace |
| 2006/0017497 | A1 | 1/2006 | Mo et al. |
| 2006/0020743 | A1 | 1/2006 | Au et al. |

* cited by examiner

FOREIGN PATENT DOCUMENTS

JP 2004-139377 A 5/2004

*Primary Examiner*—Alford W Kindred
*Assistant Examiner*—Richard Franklin
(74) *Attorney, Agent, or Firm*—Bever, Hoffman & Harms

(57) ABSTRACT

A multi-queue memory system is configured to operate in a packet mode. Each packet includes a SOP (start of packet) marker and an EOP (end of packet) marker. A packet status bit (PSB), is used to implement the packet mode. The packet status bit enables partial packet write and partial packet read operations, such that a queue switch can be performed in the middle of packet write or packet read operations. The packet status bit also enables data filtering to be performed between an activated EOP marker and a subsequently received SOP marker (i.e., between the end of one packet and the start of the next packet). Packet mark and re-write and packet mark and re-read operations are also enabled.

5 Claims, 23 Drawing Sheets

PARTIAL PACKET WRITE AND WRITE DATA FILTERING IN A MULTI-QUEUE FIRST-IN FIRST-OUT MEMORY SYSTEM

RELATED APPLICATIONS

The present application is related to, and incorporates by reference, U.S. Provisional Patent Application Ser. No. 60/591,499 filed by Mario Au, Jason Z. Mo, Xiaoping Fang, Hui Su, Cheng-Han Wu, Ta-Chung Ma and Lan Lin on Jul. 26, 2004. The present application is also related to, and incorporates by reference, U.S. Provisional Patent Application Ser. No. 60/600,347 filed by Mario Au, Jason Z. Mo, Xiaoping Fang, Hui Su, Cheng-Han Wu, Ta-Chung Ma and Lan Lin on Aug. 9, 2004.

The present application is also related to, and incorporates by reference, the following commonly owned, co-filed U.S. Patent Applications.

U.S. patent application Ser. No. 11/040,892 entitled "Multiple Counters to Relieve Flag Restriction in a Multi-Queue First-In First-Out Memory System" by Mario Au and Jason Z. Mo.

U.S. patent application Ser. No. 11/040,895, now U.S. Pat. No. 7,099,231 entitled "Interleaving Memory Blocks to Relieve Timing Bottleneck in a Multi-Queue First-In First-Out Memory System" by Mario Au, Jason Z. Mo, Ta-Chung Ma and Lan Lin.

U.S. patent application Ser. No. 11/040,637 entitled "Mark/Re-Read and Mark/Re-Write Operations in a Multi-Queue First-In First-Out Memory System" by Mario Au and Jason Z. Mo.

U.S. patent application Ser. No. 11/040,804, now U.S. Pat. No. 7,257,687 entitled "Synchronization of Active Flag and Status Bus Flags in a Multi-Queue First-In First-Out Memory System" by Mario Au, Jason Z. Mo and Cheng-Han Wu.

U.S. patent application Ser. No. 11/040,893 entitled "Status Bus Accessing Only Available Quadrants During Loop Mode Operation in a Multi-Queue First-In First-Out Memory System" by Mario Au, Jason Z. Mo and Cheng-Han Wu.

U.S. patent application Ser. No. 11/040,926 entitled "Multi-Queue Address Generator for Start and End Addresses in a Multi-Queue First-In First-Out Memory System" by Mario Au, Jason Z. Mo and Xiaoping Fang.

U.S. patent application Ser. No. 11/040,927, now U.S. Pat. No. 7,154,327 entitled "Self-Timed Multiple Blanking For Noise Suppressions During Flag Generation in a Multi-Queue First-In First-Out Memory System" by Mario Au and Jason Z. Mo.

FIELD OF THE INVENTION

The present invention relates to a multi-queue first in, first out (FIFO) memory.

PRIOR ART

In a conventional multi-queue FIFO memory, a queue switch may be performed, wherein during a read (or write) operation, processing switches from one queue (a present queue) to another queue (a new queue).

FIG. 1 is a waveform diagram illustrating a typical queue switch performed during a read operation. Read operations in the conventional multi-queue FIFO memory are performed to provide output data (DOUT) in response to a read clock signal (RCLK), a read enable signal (REN#), a read address enable signal (RADEN), a read counter value (RCNT), a write counter value (WCNT), a programmable almost empty flag (PAE#) and an empty flag (EF).

In FIG. 1, the read enable signal REN# is activated low, thereby indicating that read operations should be performed. The read clock signal RCLK exhibits queue switch cycles QS-1, QS0, QS1, QS2 and QS3, which are labeled with respect to the time that the read address enable signal RADEN is activated. The read address enable signal RADEN is activated prior to the beginning of cycle QS-1, thereby indicating that a queue switch should be performed. That is, data should no longer be read from a present queue (PQ), but rather from a new queue (NQ) identified by a new read address (not shown). In the described example, there is a four-cycle latency during a queue switch, such that data (NQ1, NQ2) is not read from the new queue until cycle QS3.

After the read address enable signal RADEN is activated, data values PQ1, PQ2, PQ3 and PQ4 are read from the present queue during the next four cycles QS-1, QS0, QS1, and QS2, respectively. During the cycles QS-1, QS0 and QS1, the read counter value ($RCNT_P$) and write counter value ($WCNT_P$) associated with the present queue are compared to generate the present programmable almost empty flag ($PAE\#_P$) and the present empty flag ($EF_P$).

Also during cycles QS-1, QS0 and QS1, the read counter value ($RCNT_N$) and the write counter value ($WCNT_N$) associated with the new queue are retrieved from memory. The new read counter value $RCNT_N$ and the new write counter value $WCNT_N$ become active during cycle QS2. The new read counter value $RCNT_N$ and the new write counter value $WCNT_N$ are compared to generate a new programmable almost empty flag value ($PAE\#_N$) and a new empty flag value ($EF_N$), which also become active during cycle QS2. Thus, during cycle QS2, the programmable almost empty flag PAE# and the empty flag EF represent the status of the new queue, even though the data value PQ4 is read from the present queue during cycle QS2.

A problem will exist if the present queue is not empty during cycle QS2, and the data value PQ4 is provided as an output value. An internal counter needs to keep track of this read operation for the present queue, and at the same time provide count values for new queue flag calculation. This problem has been solved by using a pipeline scheme at the output terminals of the write counter and the read counter, and by specifying a forced-word-fall-through (FWFT) restriction on the data output during a queue switch. Thus, if the present queue is not empty, the last data before queue switch will be output in cycle QS2 even though there is no active external read signal. This enables the read counter to predict what happens during cycle QS2, instead of relying on what actually occurs during cycle QS2. However, this scheme undesirably requires the user to process data during cycle QS2.

It would therefore be desirable to have a multi-queue FIFO memory system that is capable of determining exactly how many read operations have been performed on the present queue, without any prediction or forced data out.

Traditionally, if data is written to a multi-queue FIFO memory system, and the system detects an error, the data cannot be re-written, unless the entire device is reset and the write is performed again. Similarly, once data is read out of a multi-queue FIFO memory system, and the system detects an error during the data transmission, the erroneous data cannot be re-read.

It would therefore be desirable to have a multi-queue FIFO memory that is capable of being re-written and re-read.

Multi-queue FIFO memory systems are typically capable of operating in both a normal FIFO mode and a packet mode. In the packet mode, data packets, which include multiple data words, are processed. The beginning of each packet is identified by a start-of-packet marker/word, and the end of each packet is identified by an end-of-packet marker/word.

Traditionally, a complete data packet must be written into a single queue of a multi-queue FIFO before a queue switch can be performed. Similarly, a complete data packet must be read from a single queue of a multi-queue FIFO before a queue switch can be performed. No partial packet read or write is allowed.

Furthermore, a complete data packet must be immediately followed by another data packet. Thus, an error condition is identified if a start-of-packet marker/word does not immediately follow an end-of-packet marker/word. If any dummy words exist between an end-of-packet marker/word and the subsequent start-of-packet marker/word, a partial reset must be performed on the multi-queue FIFO memory system.

It would therefore be desirable to have a method and structure that allows a multi-queue FIFO memory system to process partial packets, without requiring a partial reset.

SUMMARY

Accordingly, the present invention provides a multi-queue memory system that can be configured to operate in a packet mode. Each packet includes a SOP (start of packet) marker and an EOP (end of packet) marker. A packet status bit (PSB), is used to implement the packet mode. The packet status bit enables partial packet write and partial packet read operations, such that a queue switch can be performed in the middle of packet write or packet read operations. The packet status bit also enables data filtering to be performed between an activated EOP marker and a subsequently received SOP marker (i.e., between the end of one packet and the start of the next packet). Packet mark and re-write and packet mark and re-read operations are also enabled.

In accordance with one embodiment, the multi-queue memory system includes a read packet count register (PCR) file that stores read packet count values and read packet status bits associated with each queue of the multi-queue memory system. For example, a system having 128 queues will have 128 corresponding read packet count values and 128 corresponding read packet status bits. Each read packet count value identifies the number of packets read from the associated queue. Each read packet status bit indicates whether a complete packet or partial packet has been read from the associated queue. To read packet data from one of the queues (i.e., a present queue), the read packet count value and read packet status bit associated with that queue are retrieved from the read PCR file.

Read operations are performed from the present queue. Each time that a complete packet is read from the present queue, the present queue read packet count value is incremented in a read packet counter. The present queue read packet count value is used to generate a packet ready flag. The read packet status bit is toggled each time that start of packet (SOP) or end of packet (EOP) marker is activated. The read packet status bit therefore indicates whether a complete packet or partial packet has been read from the present queue. If the read packet status bit indicates that an end of packet marker has been activated, but an activated start of packet marker has not yet been received, the multi-queue memory system may filter data until the activated start of packet maker is received.

A queue switch from the present queue to a new queue can be indicated by activating a read address enable signal and providing an address associated with the new queue. When a queue switch is indicated, the read packet count value and read packet status bit associated with the new queue are retrieved from the read PCR file. The packet ready flag is generated in response to the present queue read packet count value for a predetermined number of cycles after the queue switch is indicated. Data can be read from the present queue during these "transition" cycles. At the end of the transition cycles, the packet ready flag is generated in response to the new queue read packet count value. The new queue packet status bit indicates whether or not the read operation from the new queue is a continuation of a previous partial packet read operation.

The present invention implements packet write operations in a similar manner to the above-described packet read operations.

The present invention will be more fully understood in view of the following description and drawings.

DETAILED DESCRIPTION

The present invention includes a multi-queue flow-control device, which is implemented on a single chip. The multi-queue device can be configured to implement between 1 and 128 discrete FIFO queues. The user has full flexibility configuring queues within the device, being able to program the total number of queues between 1 and 128. The user can also independently select the individual queue depths.

All queues within the device have a common data input bus (write port), and a common data output bus (read port). Data written to the write port is directed to a respective queue via an internal de-multiplexer, which is addressed by a user. Data read from the read port is accessed from a respective queue via an internal multiplexer, addressed by the user. Data writes and reads can be performed at high speeds (up to 200 MHz, with access times of 3.6 ns in accordance with one embodiment of the present invention). Data write and read operations are totally independent of each other. Thus, a queue may be selected on the write port, and a different queue may be selected on the read port. Alternately, read and write operations may be selected on the same queue simultaneously.

The device provides a Full Flag (FF#) and an Empty Flag (EF#) that identify the status of the queues selected for write and read operations, respectively. The device also provides a Programmable Almost Full Flag (PAF#) and a Programmable Almost Empty Flag (PAE#) that identify the status of the queues selected for write and read operations, respectively. The positions of the PAF# and PAE# flags are programmable by the user. The flags for queue N are specified by the flag name, followed by N (e.g., PAF#_N).

Figure 1:
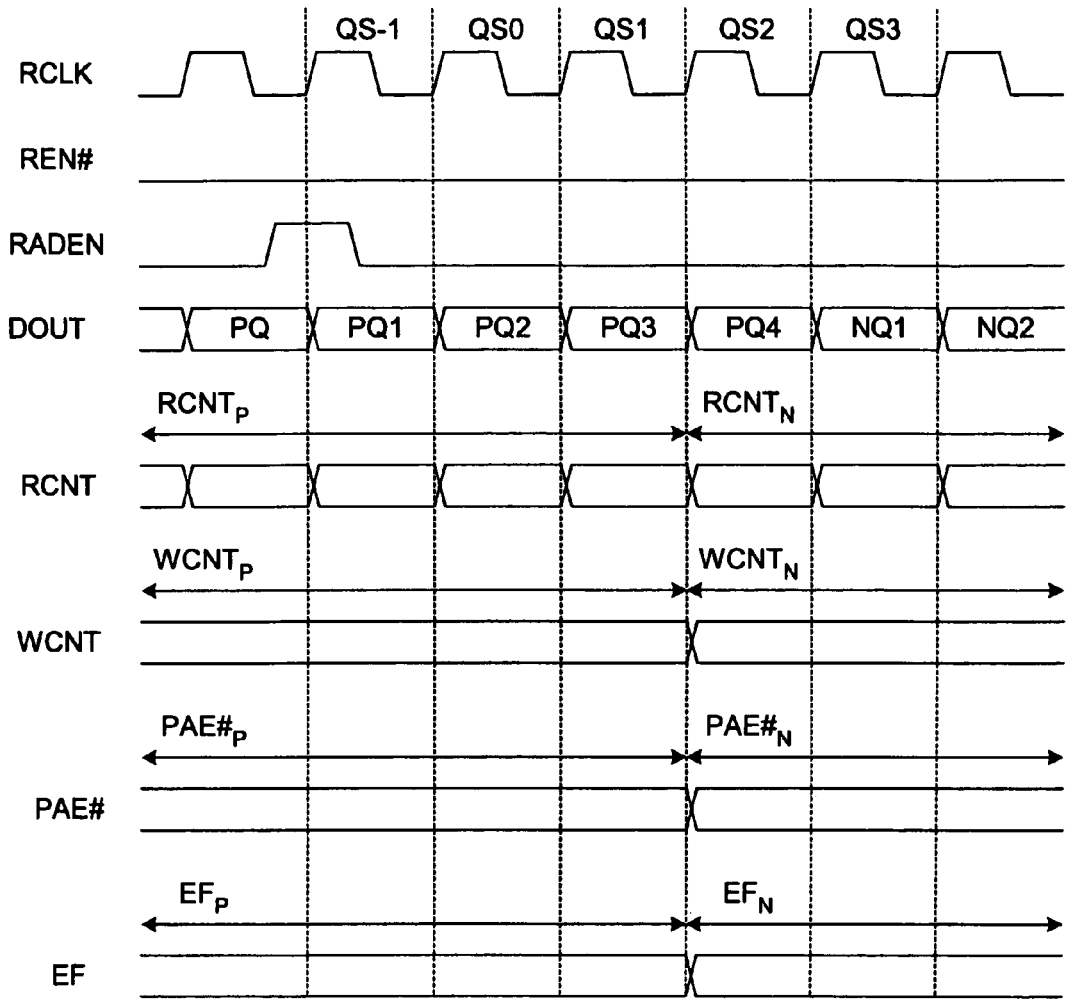
FIG. 1 is a waveform diagram illustrating a typical queue switch performed during a read operation.
Figure 2:
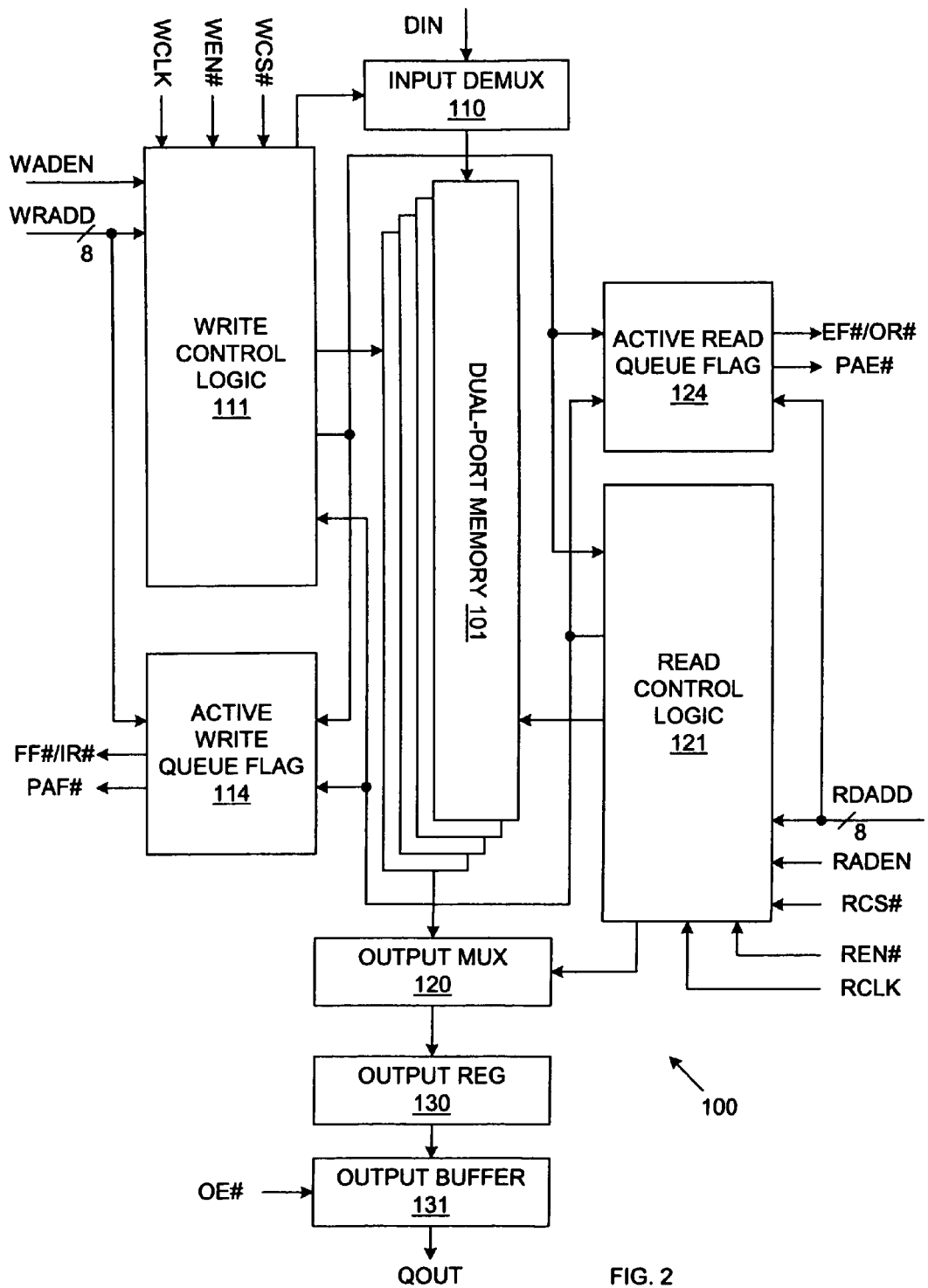
FIG. 2 is a block diagram of a multi-queue flow-control device in accordance with one embodiment of the present invention.

FIG. 2 is a block diagram of a multi-queue flow-control device 100 in accordance with one embodiment of the present invention. Device 100 includes dual-port memory 101, write port (de-multiplexer) 110, write control logic 111, active write queue flag circuit 114, output multiplexer 120, read control logic 121, active read queue flag circuit 124, output register 130 and output buffer 131. In the described embodiment, dual-port memory is a 4.7 Mbit memory, which can be logically divided into up to 128 FIFO queues, each having a minimum capacity of 9 k bits.

In general, write control logic 111 controls write accesses to the various queues in dual-port memory 101. More specifically, write control logic 111 provides the required control/address signals to input de-multiplexer 110 and dual-port memory 101 in response to a write chip select signal WCS#, a write enable signal WEN#, a write clock signal WCLK, a write address signal WRADD[7:0] and a write address enable signal WADEN. As described in more detail below, write control logic 111 also provides control signals to active write queue flag circuit 114, active read queue flag circuit 124 and read control logic 121.

Similarly, read control logic 121 controls read accesses from the various queues in dual-port memory 101. More specifically, read control logic 121 provides the required control/address signals to output multiplexer 120 and dual-port memory 101 in response to a read chip select signal RCS#, a read enable signal REN#, a read clock signal RCLK, a read address signal RDADD[7:0] and a read address enable signal RADEN. As described in more detail below, read control logic 121 also provides control signals to active write queue flag circuit 114, active read queue flag circuit 124 and write control logic 111.

As described in more detail below, active write queue flag circuit 114 generates a full flag FF# (input ready flag IR#) and programmable almost full flag PAF# in response to the write address WRADD[7:0] and the control signals received by write control logic 111 and read control logic 121. Also, as described in more detail below, active read queue flag circuit 124 generates an empty flag EF# (output ready flag OR#) and programmable almost empty flag PAE# in response to the read address RDADD[7:0] and the control signals received by write control logic 111 and read control logic 121.

Read operations to multi-queue device 100 will now be described. In general, when a queue within dual-port memory 101 is selected for a read operation, the next word in the selected queue automatically falls through output multiplexer 120 to the output register 130. All subsequent words from the selected queue require an enabled read cycle in order to be routed to the output register 130. Data cannot be read from the selected queue if the queue is empty. The active read queue flag circuit 124 provides an active-low empty flag/output ready signal (EF#/OR#) indicating when the data read from the selected queue is valid. If the user switches to a queue that is empty, the last word read from the previous queue will remain in the output register 130. As described in more detail below, dual-port memory 101 exhibits a four-cycle latency when switching from one queue to another queue (i.e., during a queue switch).

Figure 3:
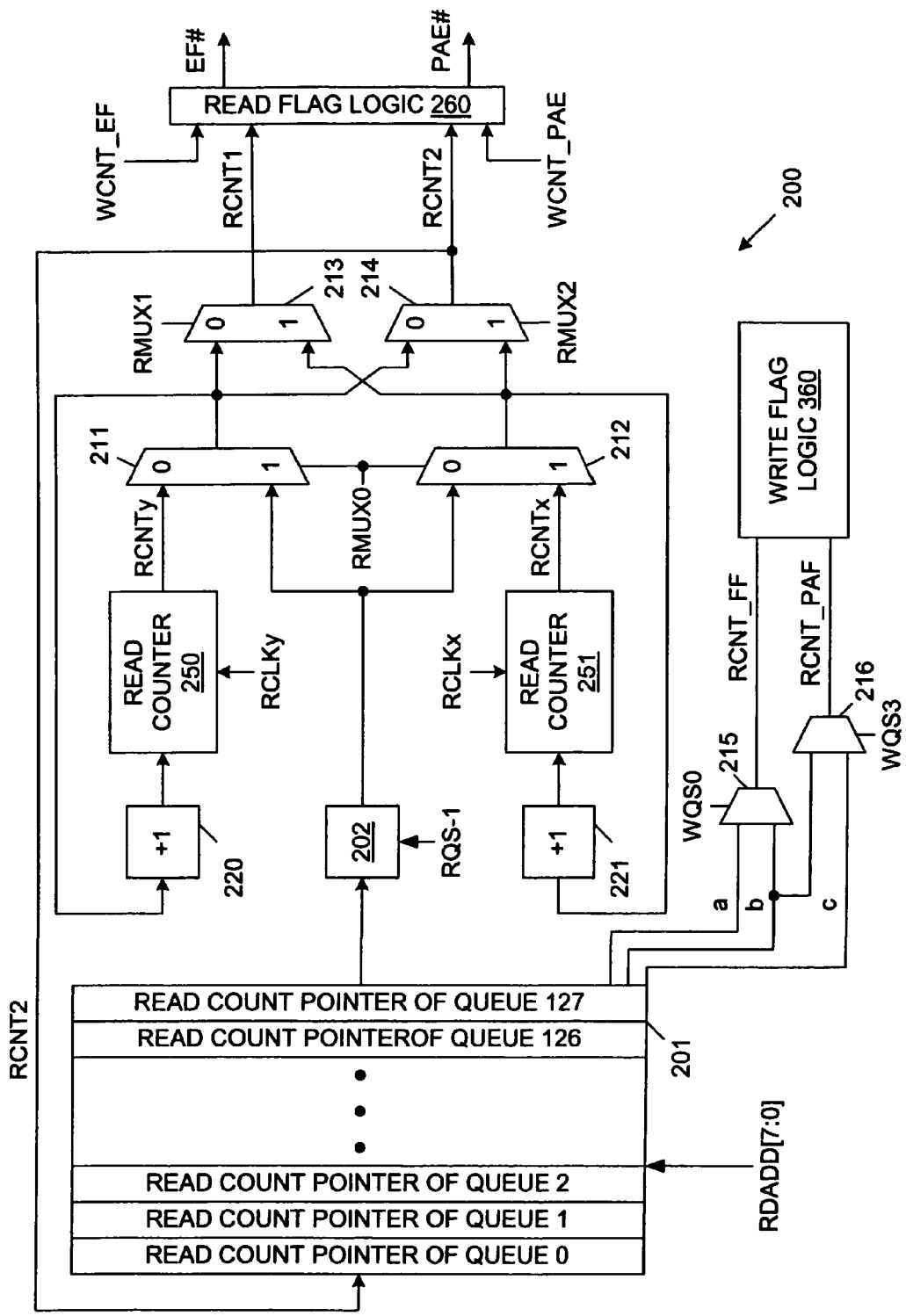
FIG. 3 is a block diagram of a read flag counter register (FCR) file having multiple read counters in accordance with one embodiment of the present invention.

FIG. 3 is a block diagram of a read flag counter register (FCR) system 200, which is located in read control logic block 121 and active read queue flag circuit 124, in accordance with one embodiment of the present invention. Read FCR system 200 includes read FCR file 201, register 202, multiplexers 211-214, adder circuits 220-221, read counters 250-251 and read flag logic 260.

Read FCR file 201 includes 128 entries, one for each possible queue in multi-queue device 100. Each entry stores a read count pointer for a corresponding queue. Each entry of read FCR file 201 is coupled to register 202 via a selection circuit (not shown). As described in more detail below, register 202 latches a read count pointer retrieved from read FCR file 201 at the start of a queue switch (during cycle QS-1). The read count pointer stored in register 202 is applied to the "1" input terminal of multiplexer 211 and the "0" input terminal of multiplexer 212.

The output terminal of multiplexer 211 is coupled to the "0" input terminals of multiplexers 213 and 214 and to adder 220. Similarly, the output terminal of multiplexer 212 is coupled to the "1" input terminals of multiplexers 213 and 214 and to adder 221. Adders 220 and 221 each add one to the read count values provided by multiplexers 211 and 212, respectively. Adders 220 and 221 apply the incremented read count values to read counters 250 and 251, respectively. Read counters 250 and 251 latch the incremented read count values on rising edges of the RCLKy and RCLKx read clock signals, respectively. Read counters 250 and 251 apply output read count values RCNTy and RCNTx, respectively, to the "0" and "1" input terminals of multiplexers 211 and 212, respectively. In the described embodiment, multiplexers 211 and 212 are controlled by the same control signal RMUX0, although this is not necessary. Multiplexers 213 and 214 are controlled by RMUX1 and RMUX2 signals, respectively. Multiplexer 213 provides an output signal RCNT1, and multiplexer 214 provides an output signal RCNT2, which are used to derive the empty flag, EF# and the programmable almost empty flag, PAE#, respectively. The RCNT2 signal is also routed back to read FCR file 201, such that the read address register file is updated to store changes in the RCNT2 signal during each read cycle (as long as the associated queue is not marked).

Figure 4:
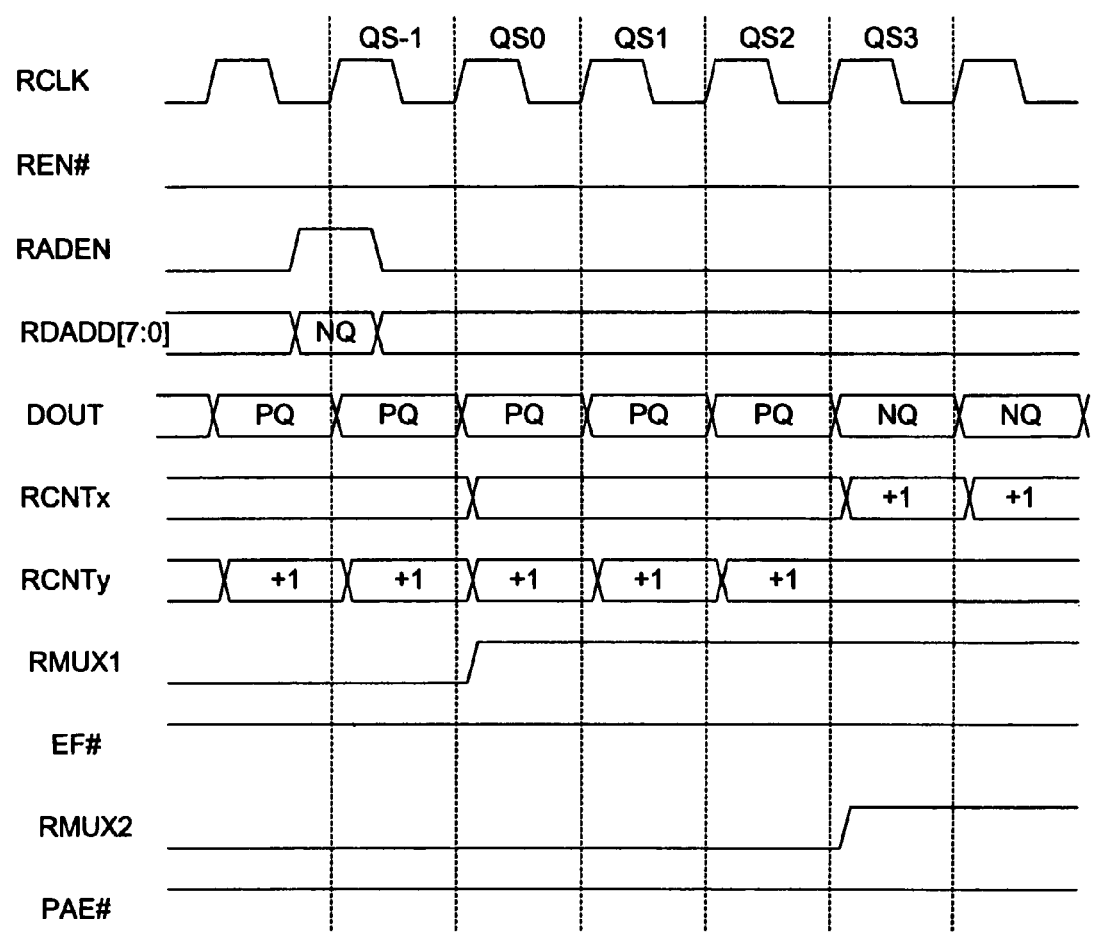
FIGS. 4, 5, 6, 7 are waveform diagrams illustrating the operation of the read FCR file of FIG. 3 in accordance with various embodiments of the present invention.

FIG. 4 is a waveform diagram illustrating the operation of read FCR system 200 in accordance with one embodiment of the present invention.

Figure 8:
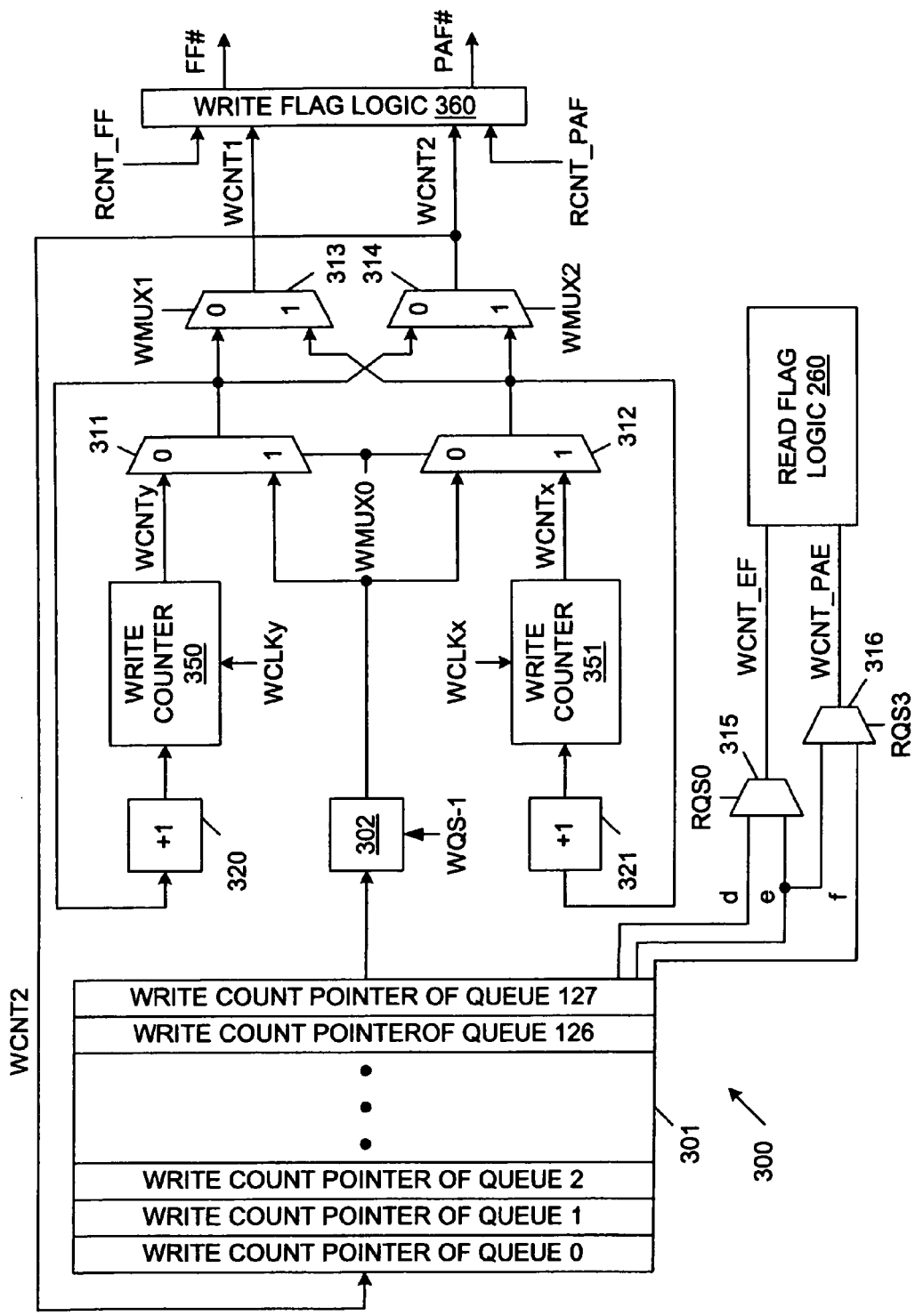
FIG. 8 is a block diagram of a write flag counter register (FCR) file in accordance with one embodiment of the present invention.

The read clock signal RCLK, read enable signal REN#, read address enable signal RADEN and read address signal RDADD[7:0] are applied to read control logic 121 (FIG. 2). Relevant cycles of the RCLK signal are labeled QS-1, QS0, QS1, QS2 and QS3. Prior to read cycle QS-1, data is being read from a first queue, which is hereinafter referred to as the present queue (PQ). At this time, read FCR system 200 is configured as follows. The read clock signal RCLK is routed as the read clock signal RCLKy to read counter 250. Read counter 250 maintains a read count value (RCNTy) associated with the present queue PQ. The RMUX0 signal has a logic "0" value, such that multiplexer 211 routes the RCNTy value provided by read counter 250 to multiplexers 213 and 214. The RMUX1 and RMUX2 signals both have a logic "0" value, such that multiplexers 213 and 214 route the RCNTy value as the RCNT1 and RCNT2 signals, respectively, to read flag logic 260. At this time, read flag logic 260 generates the empty flag EF# and programmable almost empty flag PAE# in response to the read count value RCNTy associated with the present queue PQ. More specifically, read flag logic 260 generates the empty flag EF# in response to the RCNT1 signal and a write pointer value WCNT_EF provided by a write FCR system 300 (FIG. 8). Similarly, read flag logic 260 generates the programmable almost empty flag PAE# in response to the RCNT2 signal and another write pointer value WCNT_PAE provided by the write FCR file. In general, WCNT_EF is the write count pointer of the same queue represented by the RCNT1 read count pointer, and WCNT_PAE is the write count pointer of the same queue represented by the RCNT2 read count pointer. The operation of multiplexers 315 and 316 is described in more detail in "Method to Optimize Interfaces Between Driver and Receiver Circuits in Datapaths" by Prashant Shamarao, Jason Z. Mo and Jianghui Su, U.S. Provisional Patent Application Ser. No. 60/555,716, filed Mar. 23, 2004, which is hereby incorporated by reference.

Each time that a read operation is performed from the present queue PQ, the read clock signal RCLKy is asserted, thereby causing read counter 250 to latch the incremented read count value (i.e., RCNTy plus 1) provided by adder circuit 220. Read flag logic 260 then uses the incremented RCNTy signal to generate the EF# and PAE# flags associated with the present queue PQ. In the present example, the EF# and PAE# flags associated with the present queue PQ remain de-activated high, thereby indicating that the present queue is neither empty nor almost empty.

Prior to the start of read cycle QS-1, the read address enable signal RADEN transitions to a logic "1" state, thereby indicating that a queue switch (QS) will be performed. That is, the read operations from the present queue PQ will be stopped, and read operations will be performed from a new queue (NQ) in dual port memory 101. The address of the new queue NQ is identified by the read address signal RDADD[7:0]. The RADEN and RDADD[7:0] signals are detected at the beginning of read cycle QS-1 (at the rising edge of the RCLK signal).

In response to the detected RADEN signal, read FCR file 201 retrieves the read count pointer from the register corresponding to the queue identified by the RDADD[7:0] signal. For example, if the read address signal RDADD[7:0] identifies queue 2, then read FCR file 201 provides the read count pointer of queue 2 to register 202. The write FCR system 300 (FIG. 8) also retrieves the write count pointer associated with the addressed queue (e.g., queue 2) on port "d" at this time. Data is read from the present queue and the read count value RCNTy is incremented during read cycle QS-1.

By the start of the next read cycle QS0, the read count pointer retrieved from read FCR file 201 has been loaded into register 202. At this time, multiplexer 212 routes the read count pointer stored in register 202 to the logic "1" input terminals of multiplexers 213 and 214, and to the input terminal of adder circuit 221. Also at the start of read cycle QS0, the RMUX1 signal transitions to a logic "1" value, thereby causing multiplexer 213 to route the newly retrieved read point counter associated with the new queue NQ as the RCNT1 signal. Also, at the start of read cycle QS0, the write FCR system 300 provides the newly retrieved write point counter associated with the new queue NQ as the WCNT_EF signal. In response, read flag logic 260 starts to generate a new empty flag EF# in response to the retrieved read and write count pointers associated with the new queue NQ. Data (DOUT) is still read from the present queue (and the read count value RCNTy is incremented) during read cycle QS0. Note that the RCNTy value associated with the present queue PQ signal (and provided as the RCNT2 signal) and a write count pointer associated with the present queue (WCNT_PAE) are still used to generate the programmable almost empty PAE# flag during the read cycle QS0.

During cycles QS1 and QS2, the read enable signal REN# remains activated low, thereby enabling data values to be read from the present queue PQ during cycles QS1 and QS2, and enabling read clock counter 250 to increment the RCNTy value at the rising edges of read cycles QS1 and QS2. As described in more detail below, the read enable signal REN# can be de-activated high prior to the beginning of a read cycle, thereby preventing data values from being read from the queue during the read cycle. In this case, the high REN# signal prevents the read clock signal RCLKy from clocking read counter 250, such that the read count value RCNTy is not incremented during the read cycle.

The last data value to be read from the present queue PQ is provided during read cycle QS2. The read count value RCNTy is routed through multiplexers 211 and 214 to read FCR file 201 as the RCNT2 signal. During read cycle QS2, the read count value RCNTy is stored as the read count pointer associated with the present queue PQ in read FCR file 201.

At the end of read cycle QS2, the read count value RCNTy provided by read counter 250 is representative of the exact number of read operations that have been performed to the present queue PQ, without any prediction, pipelining or forced data out. Consequently, the next time the present queue is accessed, the read count pointer retrieved from read FCR file 201 accurately represents the read address of this queue.

At the start of read cycle QS2, read flag logic 260 provides an empty flag EF# representative of the status of the new queue NQ. As described above, this empty flag EF# is provided in response to the read count pointer previously stored in register 202 during read cycle QS0 and provided as the RCNT1 signal.

Note that during cycle QS1, read flag logic 260 decodes the address of the new queue NQ, and retrieves a previously stored programmable almost empty flag PAE#, which identifies the almost empty status of the new queue NQ. During cycle QS2, read flag logic 260 provides the PAE# flag associated with the new queue as the active PAE# flag. The active PAE# flag associated with the new queue is then updated during cycle QS3 (and during subsequent cycles). This process provides an accurate result, because the earliest that a read operation can be performed to the new queue is during cycle QS3. The logic used to generate the programmable almost empty flag is described in more detail in U.S. patent application Ser. No. 11/040,804, now U.S. Pat. No. 7,257,687 entitled "Synchronization of Active Flag and Status Bus Flags in a Multi-Queue First-In First-Out Memory System", by Mario Au, Jason Z. Mo and Cheng-Han Wu, which is hereby incorporated by reference. "Synchronization of Active Flag and Status Bus Flags in a Multi-Queue First-In First-Out Memory System", by Mario Au, Jason Z. Mo and Cheng-Han Wu, which is hereby incorporated by reference.

Also during read cycle QS2, a write count pointer associated with the new queue is retrieved on port "f" of the write FCR system 300.

During read cycle QS3, data is read from the new queue NQ. More specifically, data is read from the address of the new queue NQ identified by the read count pointer stored in register 202. At the start of read cycle QS3, the read clock signal RCLK is routed to read counter 251 as the read clock signal RCLKx. At the rising edge of read cycle QS3, read counter 251 latches an incremented read count value (RCNTX plus 1) provided by adder circuit 221. During read cycle QS3, the RMUX0 signal is controlled to have a logic "1" state, thereby causing multiplexer 212 to route the incremented read count value RCNTx from read counter 251 to multiplexers 213 and 214. The multiplexer control signal RMUX2 is also controlled to have a logic "1" value, thereby causing multiplexer 214 to route the incremented read count value RCNTx associated with the new queue to read flag logic 260. The write count pointer associated with the new queue is retrieved on port "f" of the write FCR system 300 and provided to read flag logic 260 as the write count pointer WCNT_PAE during cycle QS3. Read flag logic 260 then begins to generate the programmable almost empty flag PAE# in response to the new read count pointer RCNT2 and the new write count pointer WCNT_PAE.

Figure 5:
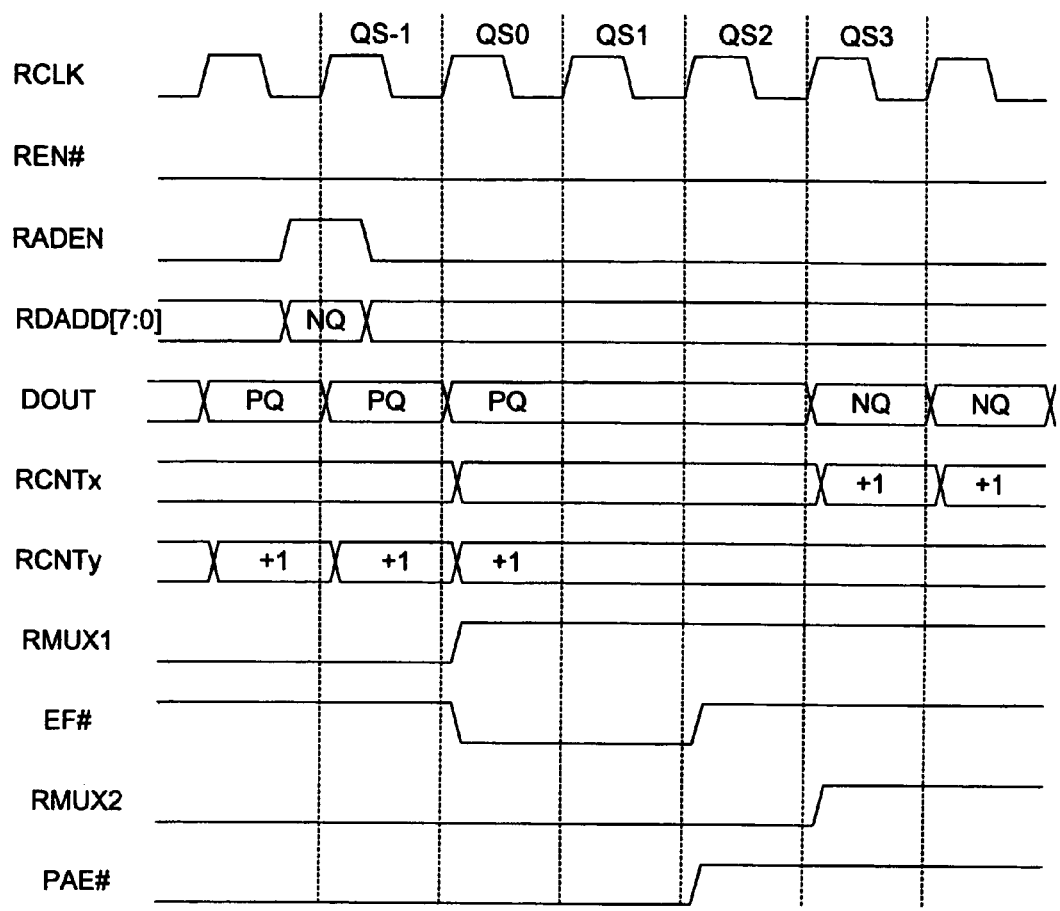

FIG. 5 is a waveform diagram illustrating the operation of read FCR system 200 in accordance with another embodiment of the present invention. The embodiment of FIG. 5 is similar to the embodiment of FIG. 4, with differences noted below. In the embodiment of FIG. 5, the last data value in the present queue PQ is read during read cycle QS0. Because the present queue becomes empty during read cycle QS0, the empty flag EF# is activated low during this read cycle. Note that the programmable almost empty flag PAE# was activated low in previous read cycles. The logic low empty flag EF# prevents additional data values from being read from the present queue, and prevents the read count value RCNTy from being incremented. This is accomplished by basic FIFO read logic, which feeds back the status of the empty flag EF# to prevent read operations from occurring (i.e., an internal read is only activated if the empty flag EF# is high and the read enable signal REN# is low).

The new queue NQ is neither empty nor almost empty in the example of FIG. 5. Consequently, the empty flag EF# and programmable almost empty flag PAE# are activated high during read cycle QS2, thereby indicating the non-empty status of the new queue NQ. A data value is read from the new queue NQ during read cycle QS3 in the manner described above in connection with FIG. 4.

Figure 6:
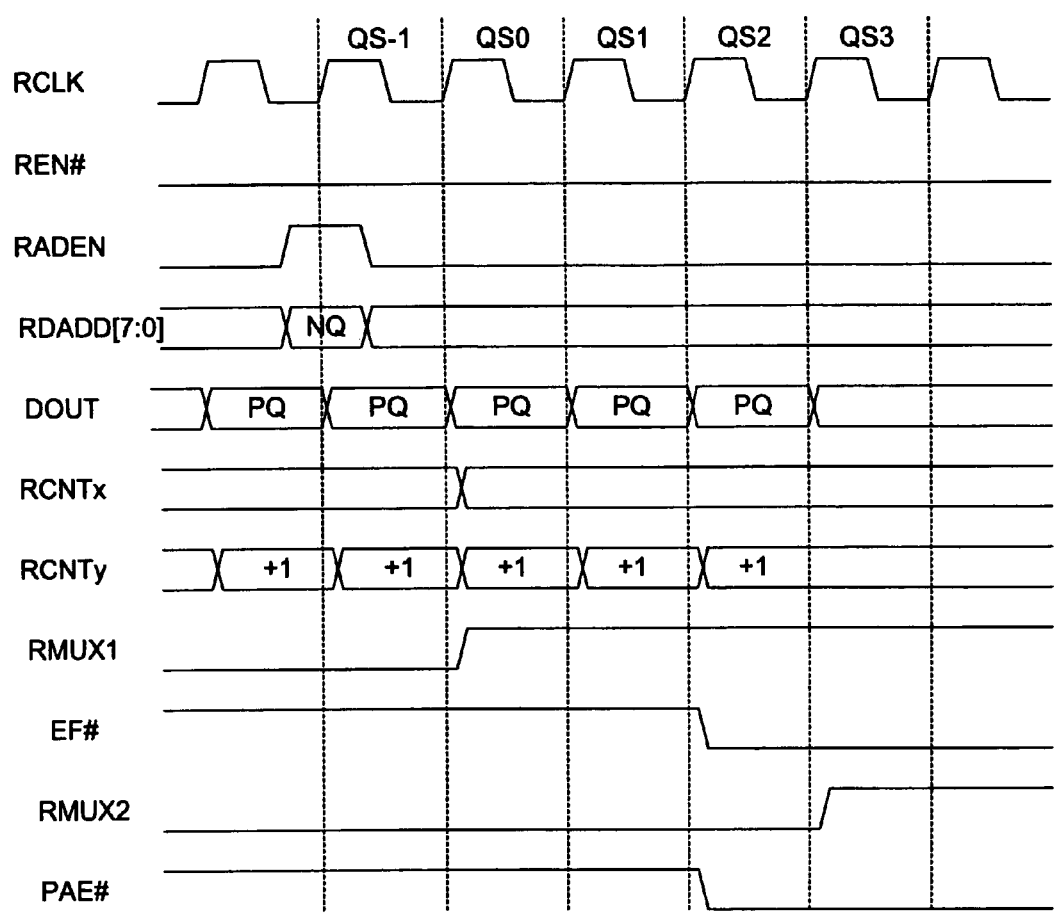

FIG. 6 is a waveform diagram illustrating the operation of read FCR system 200 in accordance with another embodiment of the present invention. The embodiment of FIG. 6 is similar to the embodiment of FIG. 4, with differences noted below. In the embodiment of FIG. 6, data values are read from the present queue PQ through read cycle QS2 in the manner described above in connection with FIG. 4. However, in the example of FIG. 6, the new queue is empty during cycle QS3. Because the new queue is empty, the empty flag EF# and the programmable almost empty flag PAE# are activated low during read cycle QS2. The logic low empty flag EF# prevents data values from being read from the new queue, and prevents the read count value RCNTx from being incremented.

Figure 7:
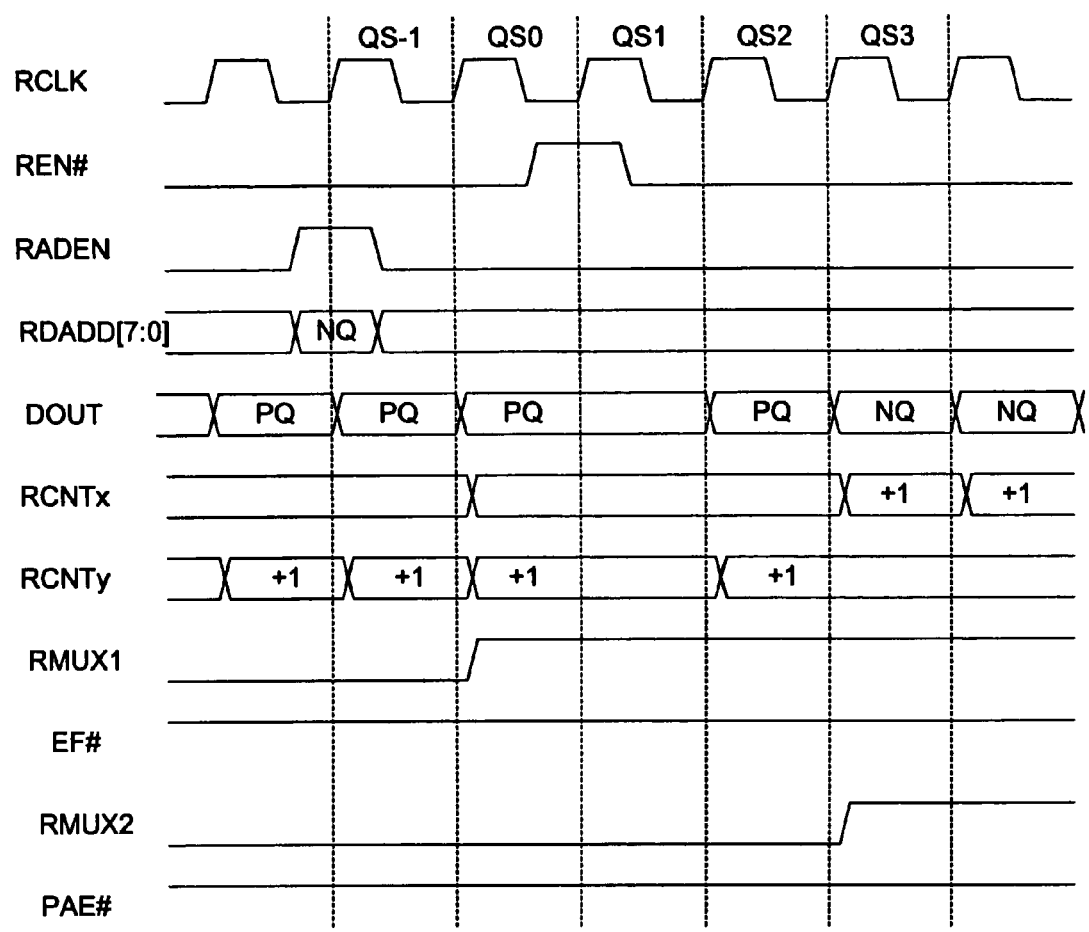

FIG. 7 is a waveform diagram illustrating the operation of read FCR system 200 in accordance with another embodiment of the present invention. The embodiment of FIG. 7 is similar to the embodiment of FIG. 4, with differences noted below. In the embodiment of FIG. 7, the read enable signal REN# is de-activated high prior to the rising edge of read cycle QS1. The logic high read enable signal REN# prevents a new data value from being read from the present queue during read cycle QS1, and prevents the read count value RCNTy from being incremented during read cycle QS1.

In the foregoing manner, a read queue switch can be implemented in a seamless and flexible manner, without requiring forced data fall through or pipelining the output data.

FIG. 8 is a block diagram of a write flag counter register (FCR) system 300, which is located in write control logic block 111 and active queue flag circuit 114, in accordance with one embodiment of the present invention. Write FCR system 300 includes write FCR file 301, register 302, multiplexers 311-314, adder circuits 320-321, write counters 350-351, and write flag logic 360. Write FCR system 300 is configured in the same manner as read FCR system 200 (FIG. 3).

Write FCR file 301 includes 128 entries, one for each possible queue in device 100. Each entry stores a write count pointer for a corresponding queue. Each entry of write FCR file 301 is coupled to register 302 via a selection circuit (not shown). As described in more detail below, register 302 latches a new write count pointer retrieved from write FCR file 301 at the start of a queue switch (during cycle QS-1). The write count pointer stored in register 302 is applied to the "1" input terminal of multiplexer 311 and the "0" input terminal of multiplexer 312.

The output terminal of multiplexer 311 is coupled to the "0" input terminals of multiplexers 313 and 314, and to the input terminal of adder 320. The output terminal of multiplexer 312 is coupled to the "1" input terminals of multiplexers 313 and 314, and to the input terminal of adder 321. Adders 320 and 321 each add one to the write count values provided by multiplexers 311 and 312, respectively. Adders 320 and 321 apply the incremented write count values to write counters 350 and 351, respectively. Write counters 350 and 351 latch the incremented write count values on rising edges of the WCLKy and WCLKx write clock signals, respectively. Write counters 350 and 351 apply output write count values WCNTy and WCNTx, respectively, to the "0" and "1" input terminals of multiplexers 311 and 312, respectively. In the described embodiment, multiplexers 311 and 312 are controlled by the same control signal WMUX0, although this is not necessary. Multiplexers 313 and 314 are controlled by WMUX1 and WMUX2 signals, respectively. Multiplexer 313 provides an output signal WCNT1, and multiplexer 314 provides an output signal WCNT2, which are used to derive the full flag FF# and the programmable almost full flag PAF#, respectively. The WCNT2 signal is also routed back to write FCR file 301 as a write count signal, such that the write FCR file 301 is updated to store changes in the WCNT2 signal during each write cycle (as long as the associated queue is not marked).

Figure 9:
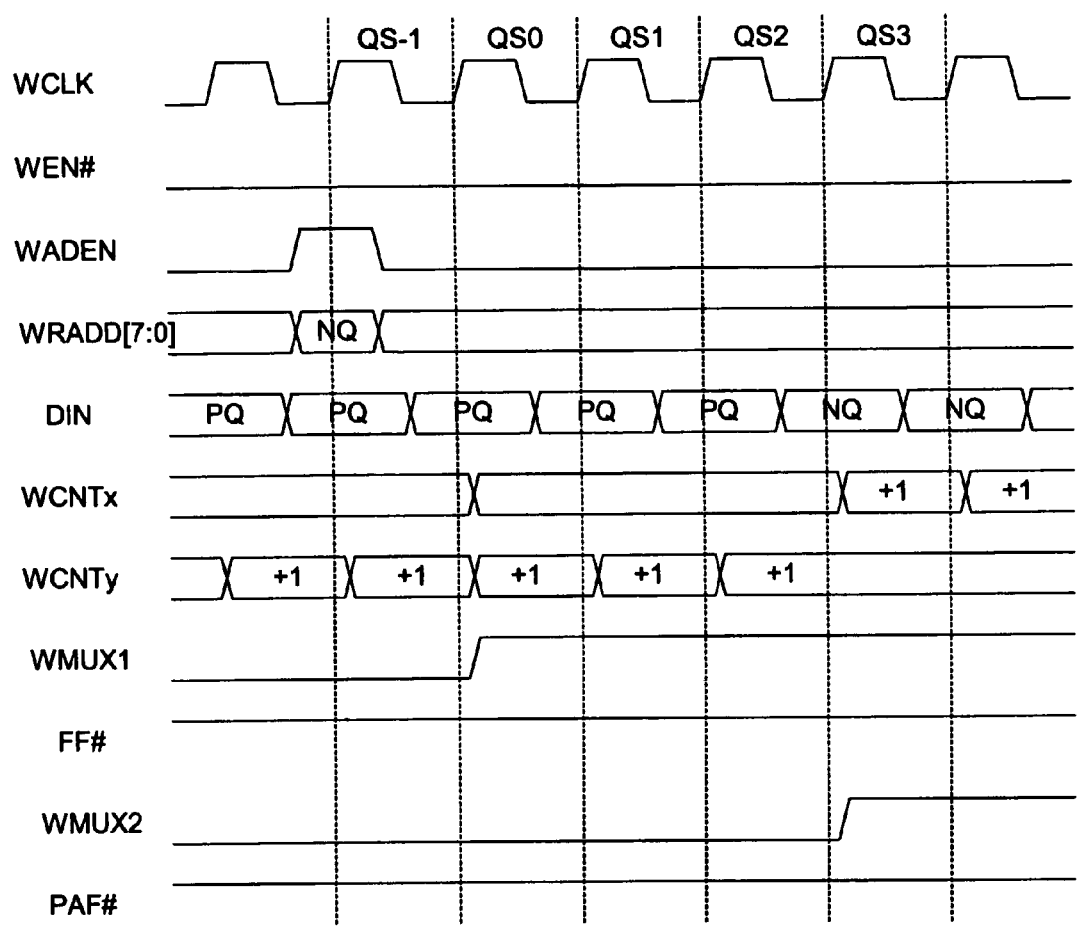
FIGS. 9, 10, 11, 12 are waveform diagrams illustrating the operation of the write FCR file of FIG. 8 in accordance with various embodiments of the present invention.

FIG. 9 is a waveform diagram illustrating the operation of write FCR system 300 in accordance with one embodiment of the present invention.

The write clock signal WCLK, write enable signal WEN#, write address enable signal WADEN and write address signal WRADD[7:0] are applied to write control logic 111 (FIG. 2).

Relevant cycles of the WCLK signal are labeled QS-1, QS0, QS1, QS2 and QS3. Prior to write cycle QS-1, data is being written to a first queue in dual-port memory 101, which is hereinafter referred to as the present queue (PQ). At this time, write FCR system 300 is configured as follows. The write clock signal WCLK is routed as the write clock signal WCLKy to write counter 350. Write counter 350 maintains a write count value (WCNTy) associated with the present queue PQ. The WMUX0 signal has a logic "0" state, such that multiplexer 311 routes the WCNTy value provided by write counter 350 to multiplexers 313 and 314. The WMUX1 and WMUX2 signals both have a logic "0" value, thereby routing the WCNTy value as the WCNT1 and WCNT2 signals. Write flag logic 360 generates the full flag FF# and programmable almost full flag PAF# in response to the write count value WCNTy associated with the present queue PQ.

Each time that a write operation is performed to the present queue PQ, the write clock signal WCLKy is asserted, thereby causing write counter 350 to latch the incremented write count value (i.e., WCNTy plus 1) provided by adder circuit 320. The incremented WCNTy signal is then used to generate the FF# and PAF# flags associated with the present queue PQ. In the present example, the FF# and PAF# flags associated with the present queue PQ remain de-activated high, thereby indicating that the present queue is neither full nor almost full.

Prior to the start of write cycle QS-1, the write address enable signal WADEN transitions to a logic "1" state, thereby indicating that a queue switch (QS) will be performed. That is, the write operations to the present queue PQ will be stopped, and write operations will be performed to a new queue (NQ) in dual port memory 101. The address of the new queue NQ is identified by the write address signal WRADD [7:0]. The WADEN and WRADD[7:0] signals are detected at the beginning of write cycle QS-1 (at the rising edge of the WCLK signal).

In response to the detected WADEN signal, write FCR file 301 retrieves the write count value from the register corresponding to the queue identified by the WRADD[7:0] signal. For example, if the write address signal WRADD[7:0] identifies queue 127, then write FCR file 301 provides the write count value of queue 127. The read FCR system 200 (FIG. 3) also retrieves the read count pointer associated with the addressed queue (e.g., queue 127) on port "a" at this time. Data is written to the present queue and the write count value WCNTy is incremented during write cycle QS-1.

By the start of the next write cycle QS0, the write count pointer retrieved from write FCR file 301 has been loaded into register 302. In response to the logic "0" WMUX0 signal, multiplexer 312 routes the write count pointer stored in register 302 to the logic "1" input terminals of multiplexers 313 and 314, and to the input terminal of adder circuit 321. Also at the start of the next write cycle QS0, the WMUX1 signal transitions to a logic "1" value, thereby routing the newly retrieved write count pointer in register 302 associated with the new queue NQ as the WCNT1 signal. Also, at the start of read cycle QS0, the read FCR system 200 provides the newly retrieved read point counter associated with the new queue NQ as the RCNT_FF signal. In response, write flag logic 360 starts to generate a new full flag FF# in response to the retrieved read and write count pointers associated with the new queue NQ. Data (DIN) is written to the present queue (and the write count value WCNTy is incremented) during the QS0 write cycle. Note that the WCNTy value associated with the present queue PQ signal (and provided as the WCNT2 signal) and a write count pointer associated with the present queue (RCNT_PAF) are still used to generate the programmable almost full PAF# flag during the read cycle QS0.

During cycles QS1 and QS2, the write enable signal WEN# remains activated low, thereby enabling data values to be written to the present queue PQ during cycles QS1 and QS2, and enabling write clock counter 350 to increment the WCNTy value at the rising edges of write cycles QS1 and QS2. As described in more detail below, the write enable signal WEN# can be de-activated high prior to the beginning of a write cycle, thereby preventing data values from being written to the queue during the write cycle. In this case, the high WEN# signal prevents the write clock signal WCLKy from clocking write counter 350, such that the write count value WCNTy is not incremented during the write cycle.

The last data value to be written to the present queue PQ is written during write cycle QS2. The write count value WCNTy is routed through multiplexers 311 and 314 as the write count value WCNT2 to write FCR file 301. During write cycle QS2, the write count value WCNTy is stored as the write count pointer associated with the present queue PQ in write FCR file 301.

At the end of write cycle QS2, the write count value WCNTy provided by write counter 350 is representative of the exact number of write operations that have been performed to the present queue PQ, without any prediction or pipelining. Consequently, the next time the present queue is written, the write count pointer retrieved from write FCR file 301 accurately represents the last write address for this queue.

At the start of write cycle QS2, write flag logic 360 provides a full flag FF# representative of the status of the new queue NQ. As described above, this full flag FF# is provided in response to the write count pointer previously stored in register 302 during read cycle QS0 and provided as the WCNT1 signal.

Note that during cycle QS1, read flag logic 360 decodes the address of the new queue NQ, and retrieves a previously stored programmable almost empty flag PAF#, which identifies the almost full status of the new queue NQ. During cycle QS2, write flag logic 360 provides the PAF# flag associated with the new queue as the active PAF# flag. The active PAF# flag associated with the new queue is then updated during cycle QS3 (and during subsequent cycles). This process provides an accurate result, because the earliest that a write operation can be performed to the new queue is during cycle QS3. The logic used to generate the programmable almost full flag is described in more detail in U.S. patent application Ser. No. 11/040,804, now U.S. Pat. No. 7,257,687 entitled "Synchronization of Active Flag and Status Bus Flags in a Multi-Queue First-In First-Out Memory System", by Mario Au, Jason Z. Mo and Cheng-Han Wu, which is hereby incorporated by reference.

Also during write cycle QS2, a read count pointer associated with the new queue is retrieved on port "c" of the read FCR system 200.

During write cycle QS3, data is written to the new queue NQ. More specifically, data is written to the address of the new queue NQ identified by the write count pointer stored in register 302. At the start of write cycle QS3, the write clock signal WCLK is routed to write counter 351 as the write clock signal WCLKx. At the rising edge of write cycle QS3, write counter 351 latches an incremented write count value (WCNTx plus 1) provided by adder circuit 321. During write cycle QS3, the WMUX0 signal is controlled to have a logic "1" value, thereby causing multiplexer 312 to route the incremented write count value WCNTx from write counter 351 to multiplexers 313 and 314. The multiplexer control signal WMUX2 is controlled to have a logic "1" value, thereby routing the incremented write count value WCNTx to write flag logic 360. The read count pointer associated with the new queue is retrieved on port "c" of the read FCR system 200 and provided to write flag logic 360 as the read count pointer RCNT_PAF during cycle QS3. Write flag logic 360 then begins to generate the programmable almost full flag PAF# in response to the new write count pointer RCNT2 and the new read count pointer RCNT_PAF.

Figure 10:
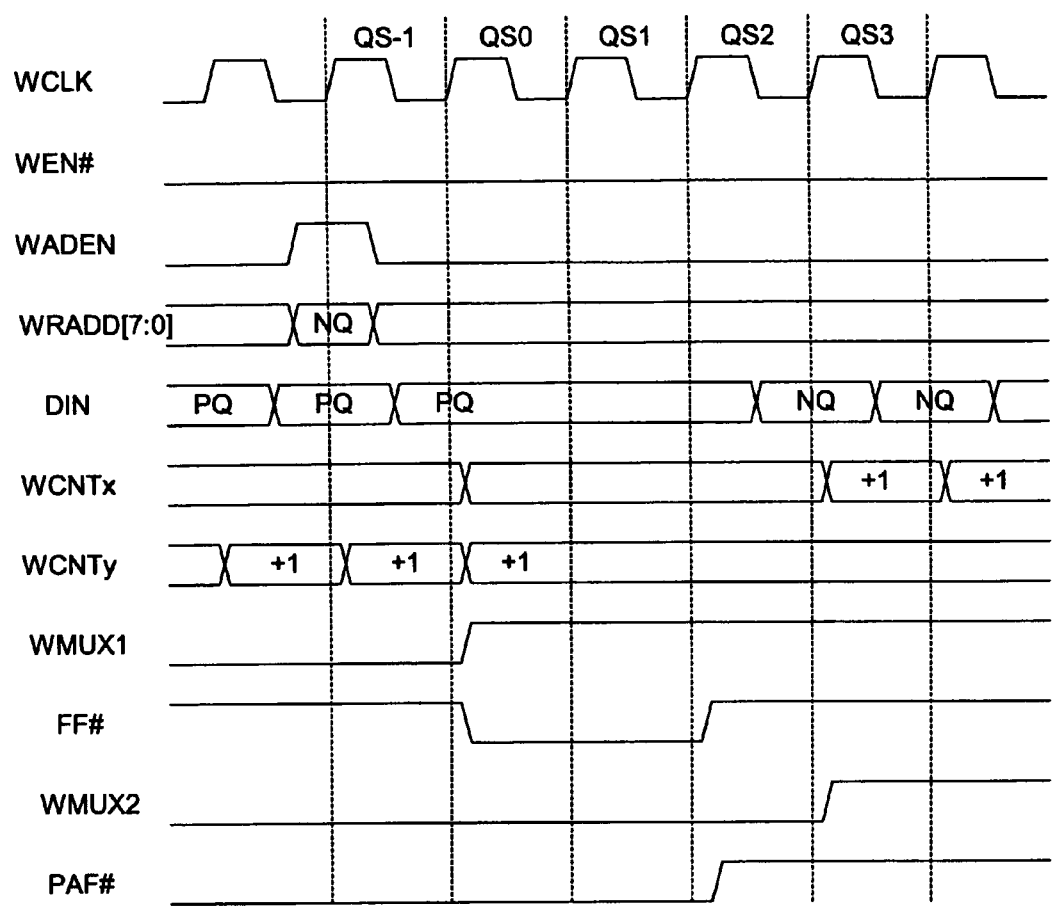

FIG. 10 is a waveform diagram illustrating the operation of write FCR system 300 in accordance with another embodiment of the present invention. The embodiment of FIG. 10 is similar to the embodiment of FIG. 9, with differences noted below. In the embodiment of FIG. 10, the last data value written to the present queue PQ is written during write cycle QS0. Because the present queue is full during write cycle QS0, the full flag FF# is activated low during this write cycle. Note that the programmable almost full flag PAF# was activated low in previous write cycles. The logic low full flag FF# prevents additional data values from being written to the present queue, and prevents the write count value WCNTy from being incremented. This is accomplished by basic FIFO read logic, which feeds back the status of the full flag FF# to prevent write operations from occurring (i.e., an internal write is only activated if the full flag FF# is high and the write enable signal WEN# is low).

The new queue NQ is neither full nor almost full in the example of FIG. 10. Consequently, the full flag FF# and programmable almost full flag PAF# are de-activated high during write cycle QS2, thereby indicating the non-full status of the new queue NQ. A data value is written to the new queue NQ during write cycle QS3 in the manner described above in connection with FIG. 9.

Figure 11:
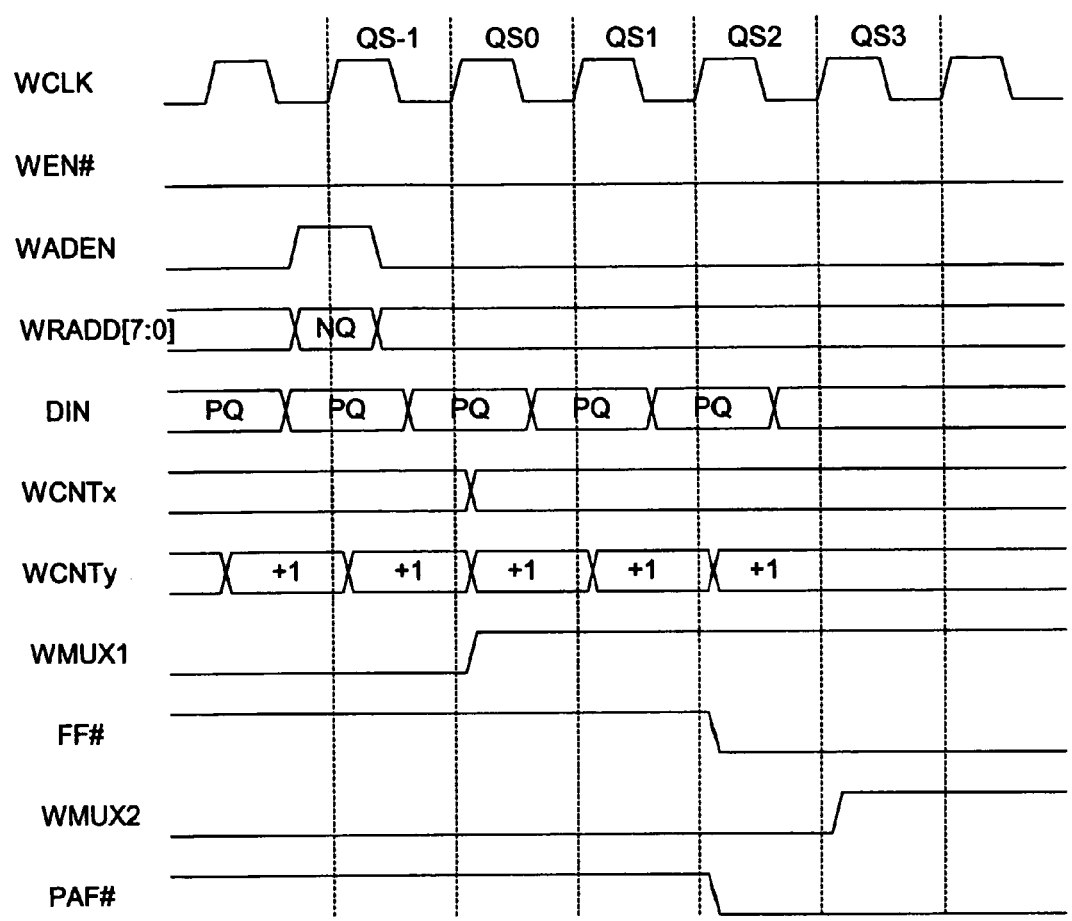

FIG. 11 is a waveform diagram illustrating the operation of write FCR system 300 in accordance with another embodiment of the present invention. The embodiment of FIG. 11 is similar to the embodiment of FIG. 9, with differences noted below. In the embodiment of FIG. 11, data values are written to the present queue PQ through write cycle QS2 in the manner described above in connection with FIG. 9. However, in the example of FIG. 11, the new queue is full during cycle QS3. Because the new queue is full, the full flag FF# and the programmable almost full flag PAF# are activated low during write cycle QS2. The logic low full flag FF# prevents data values from being written to the new queue, and prevents the write count value WCNTx from being incremented.

Figure 12:
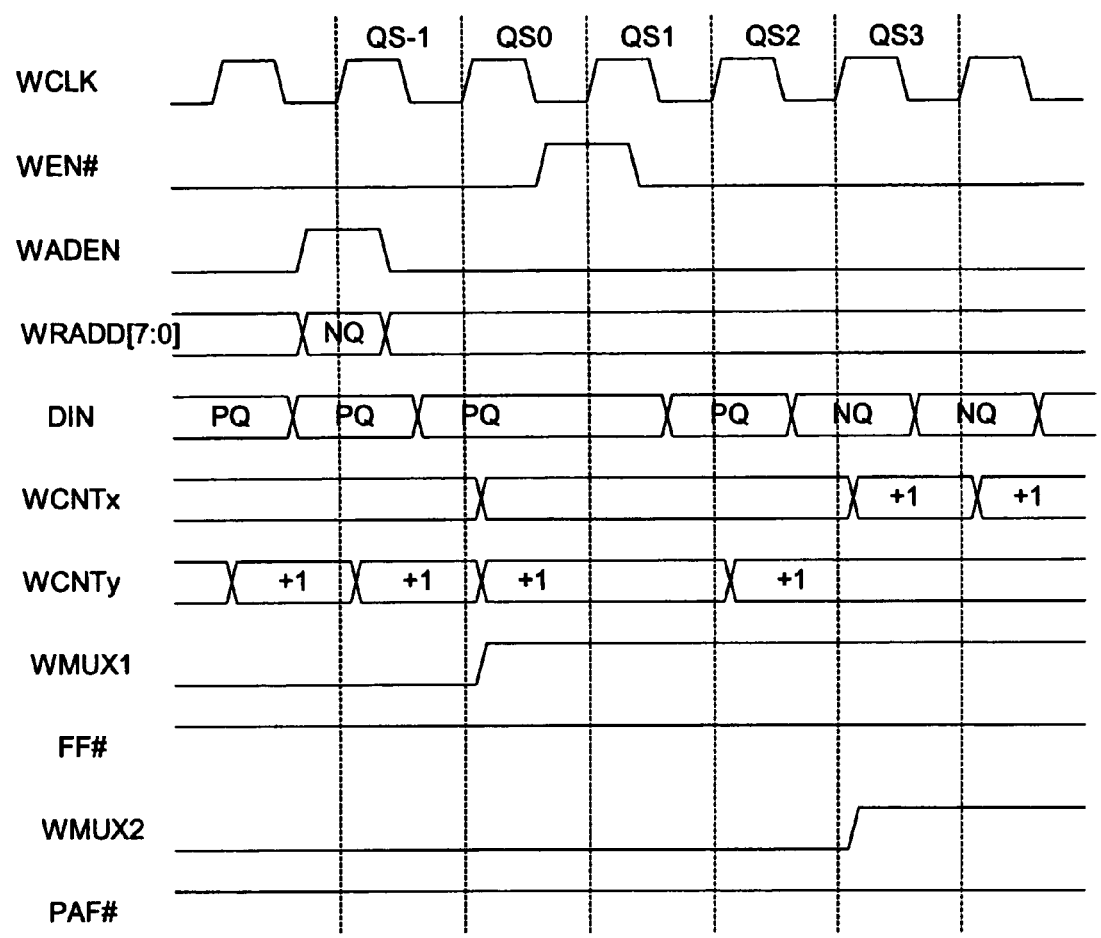

FIG. 12 is a waveform diagram illustrating the operation of write FCR system 300 in accordance with another embodiment of the present invention. The embodiment of FIG. 12 is similar to the embodiment of FIG. 9, with differences noted below. In the embodiment of FIG. 12, the write enable signal WEN# is de-activated high prior to the rising edge of write cycle QS1. The logic low write enable signal WEN# prevents a new data value from being written to the present queue during write cycle QS1, and prevents the write count value WCNTy from being incremented during write cycle QS1.

In the foregoing manner, a write queue switch can be implemented in a seamless and flexible manner, without requiring forced data fall through or pipelining the output data.

In accordance with another embodiment, a mark/re-write protocol and a mark/re-read protocol are implemented within multi-queue FIFO memory system 100. During a write (or read) queue switch, the system has the option to mark a write (or read) queue, and during the next queue switch, to request a re-write (or re-read) operation. If the queue is not marked, the system cannot request a re-write (or re-read) operation. A mark operation performed at the read port is independent of a mark operation performed at the write port. The system may mark both the write and read queues, or either one of these queues individually. In accordance with the present embodiment, the write queue is marked by controlling the write address enable signal (WADEN) and the read queue is marked by controlling the read address enable signal (RADEN). In other embodiments, the write and read queues can be marked by other signals.

The mark/re-write, mark/re-read can be used to improve the quality of written, or read data. If too many write/read errors are detected, a re-write/re-read operation can be performed, starting at the marked location.

Figure 13:
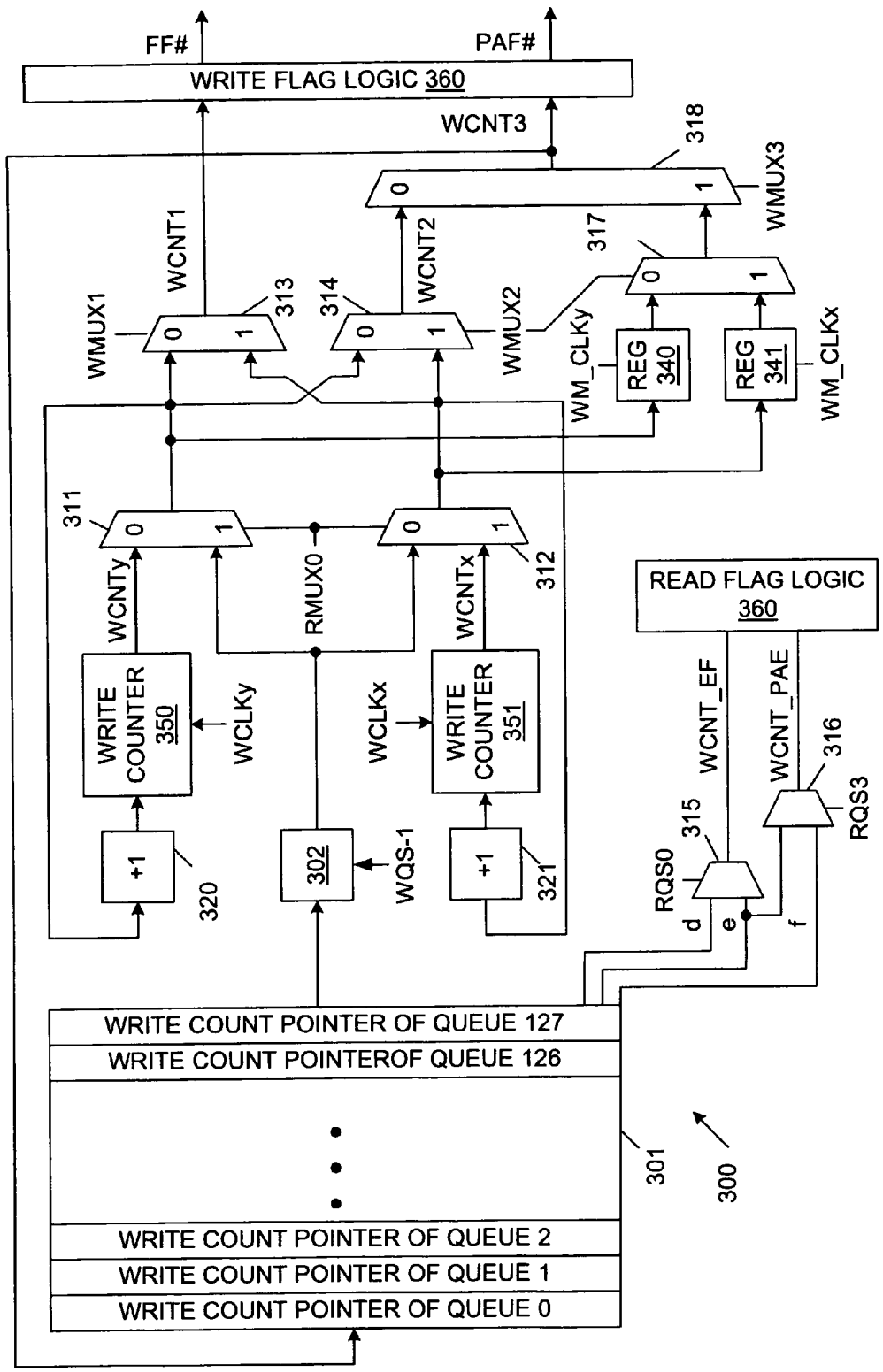
FIG. 13 is a block diagram of the write flag counter register (FCR) file of FIG. 8, which is shown in more detail to include mark/re-write circuitry.

FIG. 13 is a block diagram of the write flag counter register (FCR) system 300 of FIG. 8, which is shown in more detail to include write mark registers 340-341 and multiplexers 317-318. Write mark registers 340 and 341 are coupled to receive the write count values provided by multiplexers 311 and 312, respectively. Registers 340 and 341 are clocked in response to write mark clock signals WM_CLKy and WM_CLKx, respectively. The output terminals of write mark registers 340 and 341 are coupled to the "0" and "1" input terminals of multiplexer 317, respectively. The control terminal of multiplexer 317 is controlled by the WMUX2 signal. The output terminal of multiplexer 317 is coupled to the "1" input terminal of multiplexer 318. The "0" input terminal of multiplexer 318 is coupled to receive the write count value WCNT2 from the output of multiplexer 314. Multiplexer 318 provides a write count value WCNT3 to write flag logic 360 in response to multiplexer control signal WMUX3. Note that in the above-described operation of write FCR system 300 (FIG. 8), it is assumed that the WMUX3 signal has a logic "0" value, thereby effectively removing registers 340-341 and multiplexers 317-318 from write FCR system 300.

Figure 14:
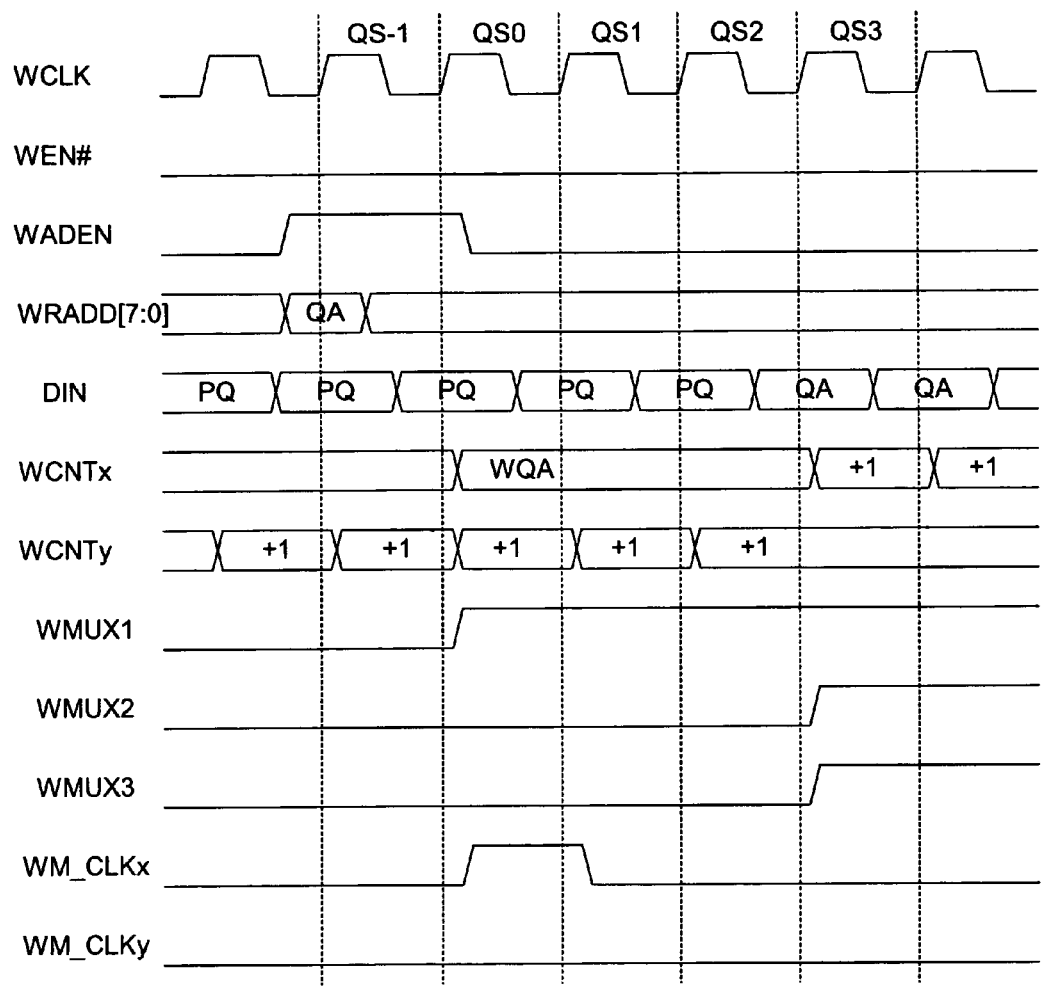
FIG. 14 is a waveform diagram illustrating a write mark operation in accordance with one embodiment of the present invention.

FIG. 14 is a waveform diagram illustrating a write mark operation in accordance with one embodiment of the present invention.

The write operations and queue switch are performed in a manner similar to that described above in connection with FIG. 9. Thus, during write cycle QS0, the write count pointer WQA associated with a new queue QA is retrieved from write FCR file 301 and stored in register 302. However, during write cycle QS0, the write address enable signal WADEN is activated to a logic "1" state. In response, the write mark clock signal WM_CLKx is activated, thereby causing the write count pointer WQA associated with the new queue QA (which is stored in register 302) to be latched into register 341. Saving the first write count pointer WQA associated with the new queue QA effectively "marks" this queue for a potential re-write operation. The WMUX3 signal transitions to a logic "1" state during cycle QS3 thereby providing the write count pointer WQA stored in register 341 as the write count value WCNT3 to write flag logic 360. As a result, data cannot be read out beyond the write queue pointer WQA stored in register 341.

Figure 15:
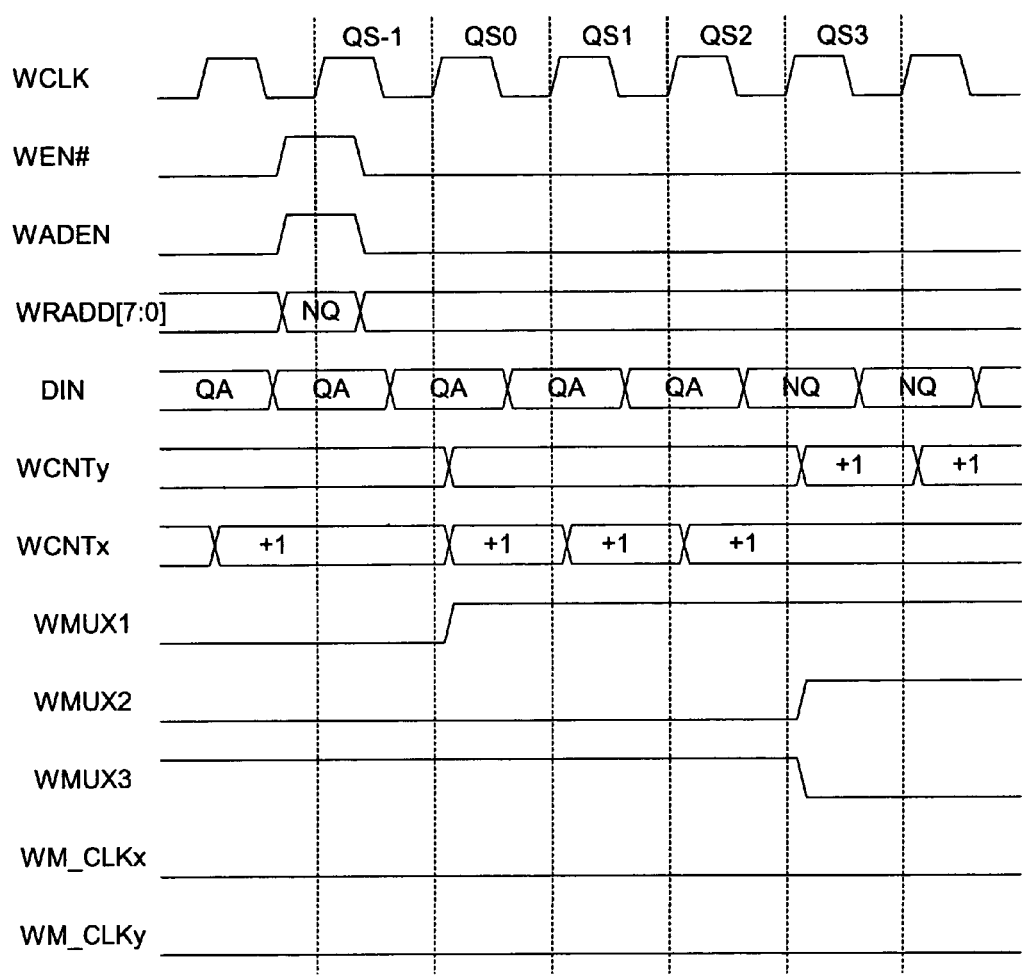
FIG. 15 is a waveform diagram illustrating the next queue switch, which occurs after the queue switch illustrated by FIG. 14.

FIG. 15 is a waveform diagram illustrating the next queue switch, which occurs after the queue switch illustrated by FIG. 14.

As illustrated in FIG. 15, the WEN# signal and the write address enable signal WADEN are both activated to logic "1" states during cycle QS-1, thereby indicating that a re-write operation should be performed to queue QA. The WMUX3 signal maintains a logic "1" value in response to the logic "1" states of the WEN# and WADEN signals. Consequently, the initial write count pointer WQA stored in register 341 continues to be routed as the WCNT3 value, and is written back to write FCR file 301 during write cycle QS2. Thus, write queue pointer associated with queue QA is not "updated" during cycles QS0-QS2.

Similarly, the original physical write address associated with the write queue QA is not updated if the write queue QA has been marked and a re-write operation has been requested. Note that the original physical write address is stored in a write memory address register (MAR) file, which is described in U.S. patent application Ser. No. 11/040,895, now U.S. Pat. No. 7,099,231 entitled "Interleaving Memory Blocks to Relieve Timing Bottleneck in a Multi-Queue First-In First-Out Memory System" by Mario Au, Jason Z. Mo, Ta-Chung Ma and Lan Lin. The original physical write address is always stored in the write MAR file while the write queue QA is marked. During the next queue switch, if a re-write operation is indicated, the original physical write address stored in the write MAR file will not be overwritten by an incremented write address value. Instead, the incremented write address value is discarded in response to the re-write request. Thus, the write MAR file maintains the original physical write address during the next queue switch.

The next time that a queue switch results in queue QA being accessed, the original write queue pointer WQA and the original physical write address are retrieved, and data is written starting at the original physical write address associated with the original write queue pointer WQA. As a result, a re-write operation is performed, thereby effectively flushing the previously written data.

Figure 16:
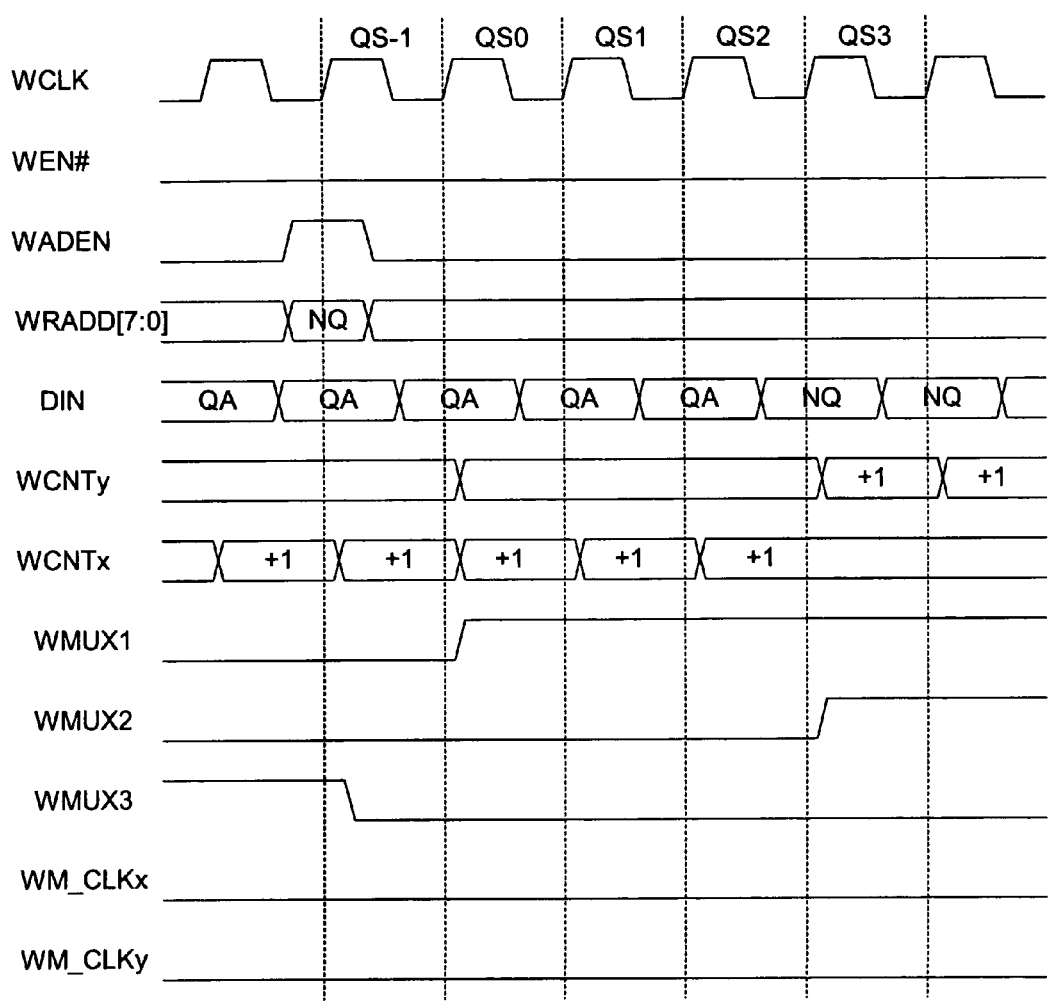
FIG. 16 is a waveform diagram illustrating operation when a queue is marked, but a re-write operation is not performed.

FIG. 16 is a waveform diagram illustrating operation when the queue QA is marked, but a re-write operation is not performed.

As illustrated in FIG. 16, the WEN# signal has a logic "0" state when the write address enable signal WADEN is activated to a logic "1" state during cycle QS-1, thereby indicating that a re-write operation should not be performed to queue QA. The WMUX3 signal transitions to a logic "0" value in response to the logic "0" state of the WEN# signal and the logic "1" state of the WADEN signal. Consequently, the updated write count pointer provided by write counter 351 is routed as the WCNT3 value, and is written back to write FCR file 301 during write cycle QS2. Thus, the write queue pointer associated with queue QA is "updated" during cycles QS0-QS2. In addition, an updated (incremented) physical write address is written back to the write MAR file, overwriting the original physical write address associated with write queue QA.

The next time that a queue switch results in queue QA being accessed, the updated write queue pointer and updated physical write address are retrieved, such that data is written starting at the updated physical write address associated with the updated write queue pointer. As a result, no re-write operation is performed, thereby keeping the previously written data.

If the present queue has not been marked for a re-write operation, then a logic high WEN# signal and a logic high WADEN signal cannot signify a re-write operation. If this situation occurs, it is regarded as a no-write condition in cycle QS-1.

Figure 17:
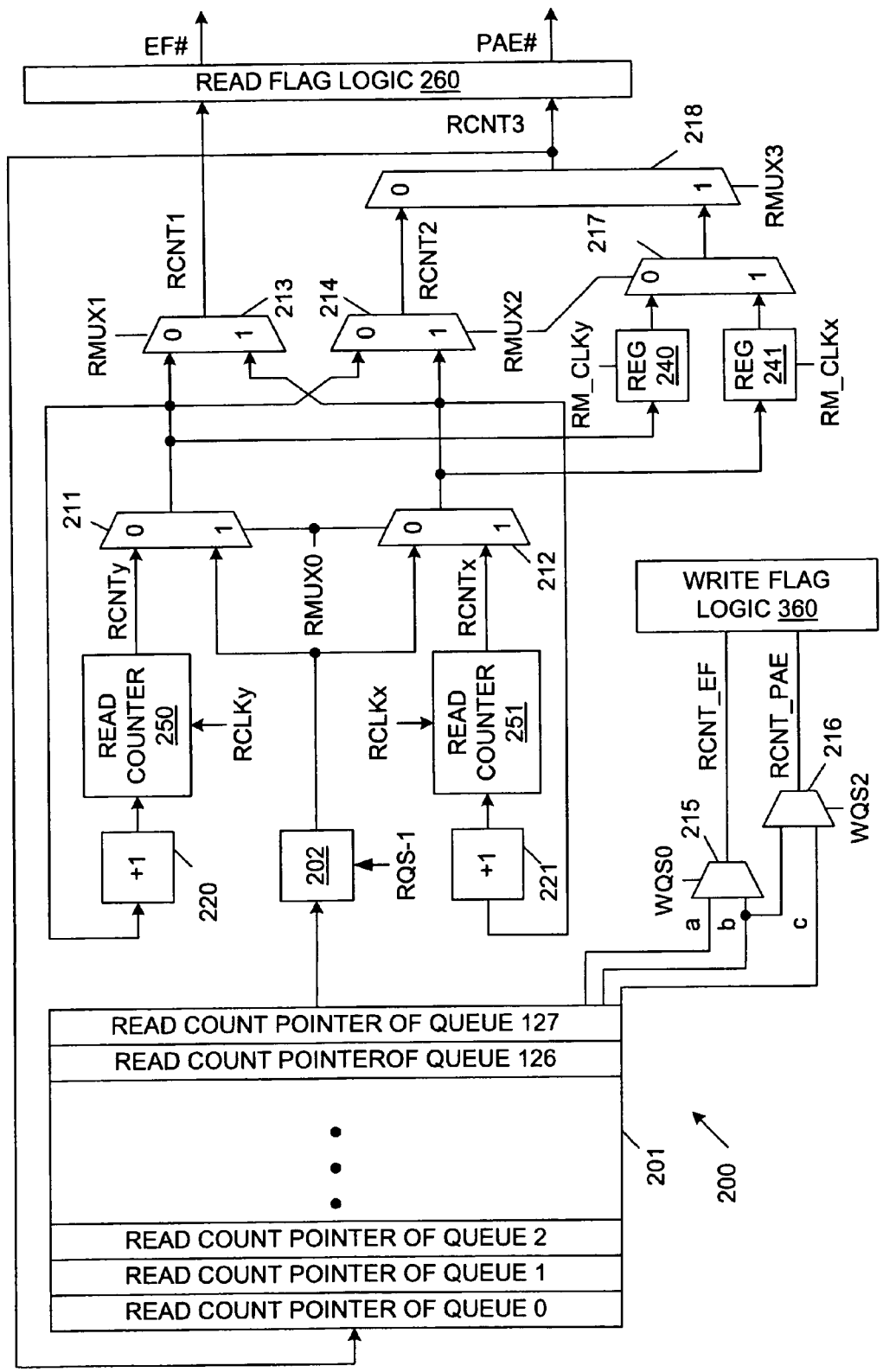
FIG. 17 is a block diagram of the read flag counter register (FCR) file of FIG. 3, which is shown in more detail to include mark/re-read circuitry.

FIG. 17 is a block diagram of the read flag counter register (FCR) system 200 of FIG. 3, which is shown in more detail to include read mark registers 240-241 and multiplexers 217-218. Read mark registers 240 and 241 are coupled to receive the read count values provided by multiplexers 211 and 212, respectively. Registers 240 and 241 are clocked in response to read mark clock signals RM_CLKy and RM_CLKx, respectively. Read mark registers 240-241 and multiplexers 217-218 are connected in the same manner as write mark registers 340-341 and multiplexers 317-318 (FIG. 13). Note that in the above-described operation of read FCR system 200 (FIG. 3), it is assumed that the RMUX3 signal has a logic "0" value, thereby effectively removing registers 240-241 and multiplexers 217-218 from read FCR system 200.

Figure 18:
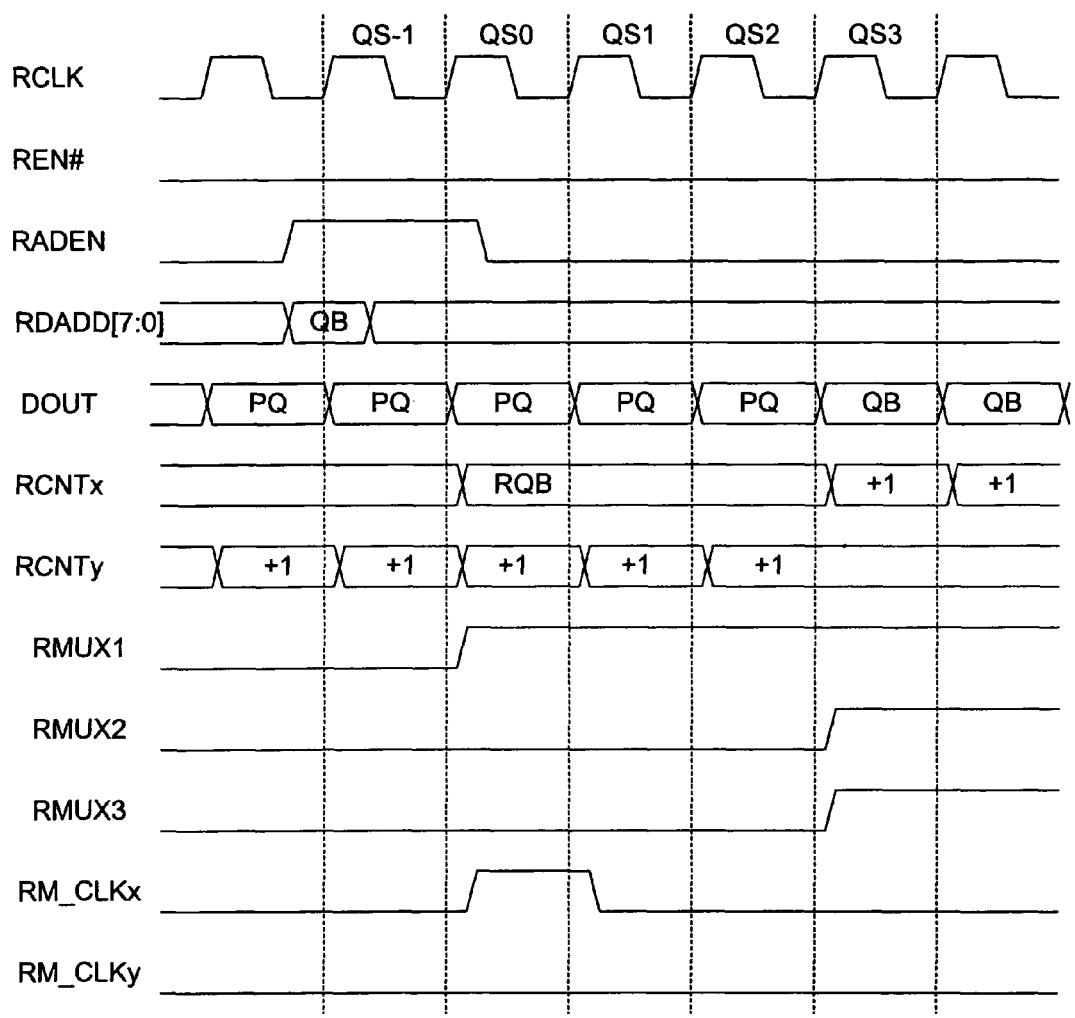
FIG. 18 is a waveform diagram illustrating a read mark operation in accordance with one embodiment of the present invention.

FIG. 18 is a waveform diagram illustrating a read mark operation in accordance with one embodiment of the present invention.

The read operations and queue switch are performed in a manner similar to that described above in connection with FIG. 4. Thus, during read cycle QS0, the read count pointer RQB associated with a new queue QB is retrieved from read FCR file 201 and stored in register 202. However, during read cycle QS0, the read address enable signal RADEN is activated to a logic "1" state. In response, the read mark clock signal RM_CLKx is activated to a logic "1" state, thereby causing the read count pointer RQB associated with the new queue QB (which is stored in register 202) to be latched into read mark register 241. Saving the first read count pointer RQB associated with the new queue QB effectively "marks" this queue for a potential re-read operation. The RMUX3 signal transitions to a logic "1" state during cycle QS3 thereby providing the read count pointer RQB stored in register 241 as the read count value RCNT3 to read flag logic 260. As a result, data cannot be written beyond the read queue pointer RQB stored in register 241.

Figure 19:
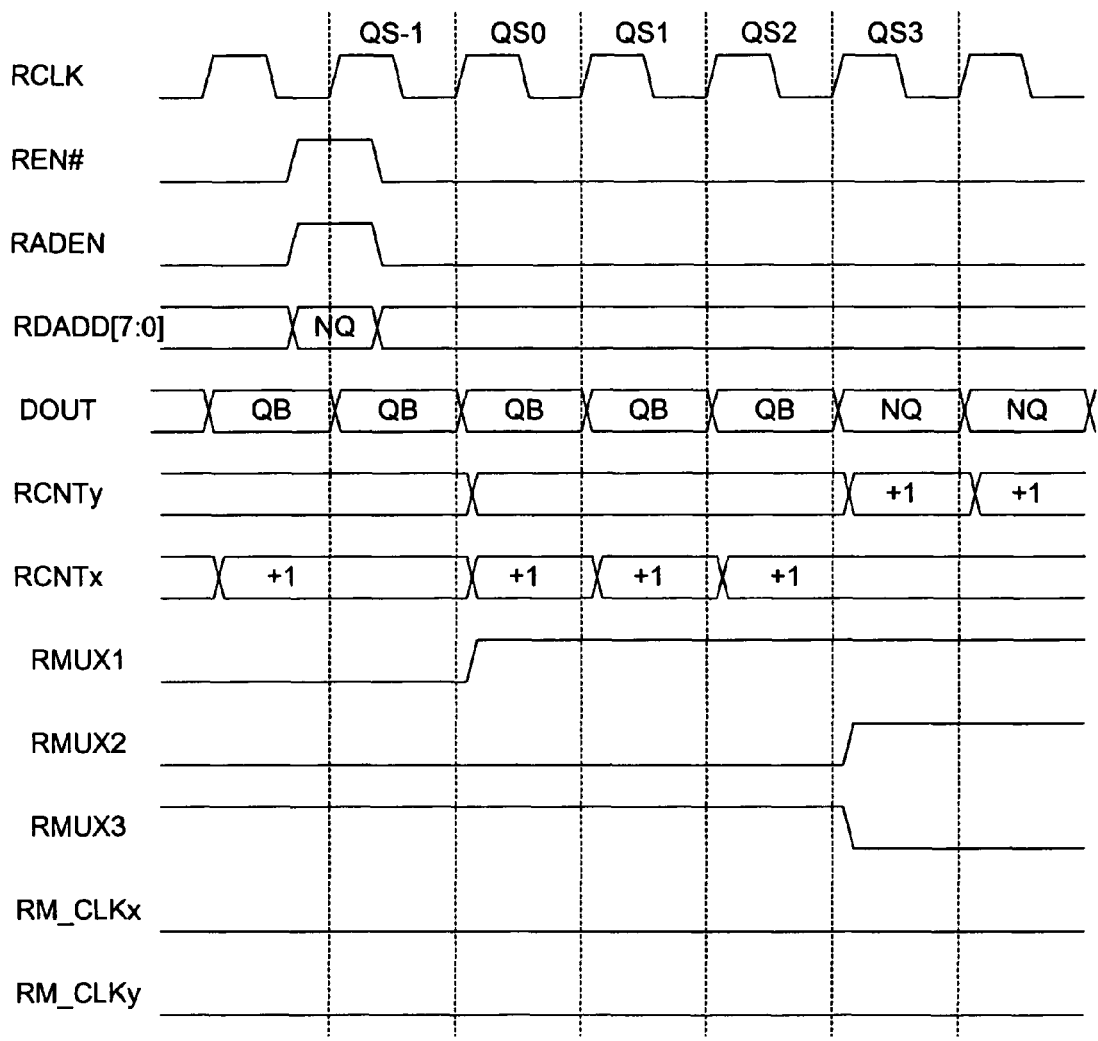
FIG. 19 is a waveform diagram illustrating the next queue switch, which occurs after the queue switch illustrated by FIG. 18.

FIG. 19 is a waveform diagram illustrating the next queue switch, which occurs after the queue switch illustrated by FIG. 18.

As illustrated in FIG. 19, the REN# signal and the read address enable signal RADEN are both activated to logic "1" states during cycle QS-1, thereby indicating that a re-read operation should be performed to queue QB. The RMUX3 signal maintains a logic "1" value in response to the logic "1" states of the REN# and RADEN signals. Consequently, the initial read count pointer RQB stored in register 241 continues to be routed as the RCNT3 value, and is written back to read FCR file 201 during read cycle QS2. Thus, the read queue pointer associated with queue QB is not "updated" during cycles QS0-QS2.

Similarly, the original physical read address associated with the read queue QB is not updated if the read queue QB has been marked and a re-read operation has been requested. Note that the original physical read address is stored in a read memory address register (MAR) file, which is described in U.S. patent application Ser. No. 11/040,895, now U.S. Pat. No. 7,099,231 entitled "Interleaving Memory Blocks to Relieve Timing Bottleneck in a Multi-Queue First-In First-Out Memory System" by Mario Au, Jason Z. Mo, Ta-Chung Ma and Lan Lin. The original physical read address is always stored in the read MAR file while the read queue QB is marked. During the next queue switch, if a re-read operation is indicated, the original physical read address stored in the read MAR file will not be overwritten by an incremented read address value. Instead, the incremented read address value is discarded in response to the re-read request. Thus, the read MAR file maintains the original physical read address during the next queue switch.

The next time that a queue switch results in queue QB being accessed, the original read queue pointer RQB and the original physical read address are retrieved, such that data is read starting at the original physical read address associated with the original read queue pointer RQB. As a result, a re-read operation is performed.

Figure 20:
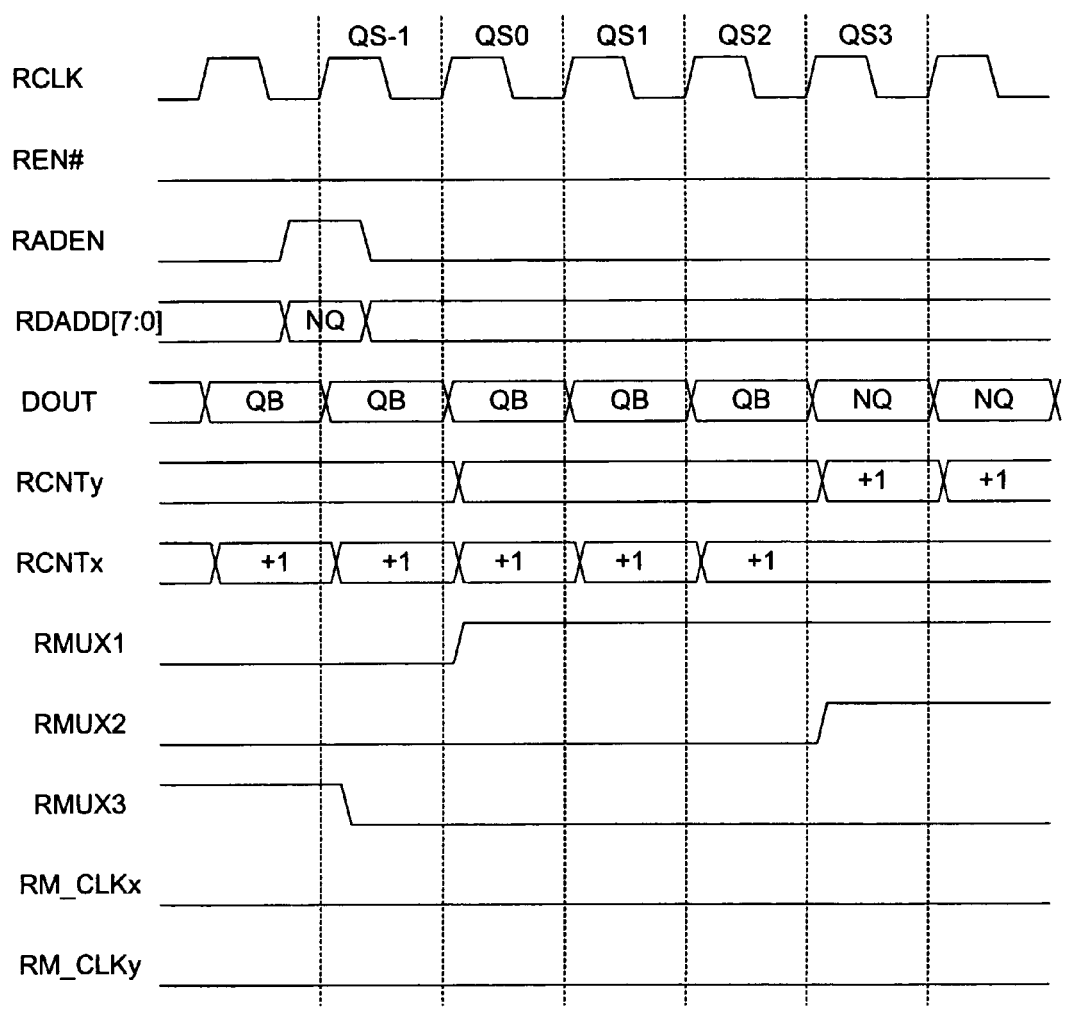
FIG. 20 is a waveform diagram illustrating operation when the queue QB is marked, but a re-read operation is not performed.

FIG. 20 is a waveform diagram illustrating operation when the queue QB is marked, but a re-read operation is not performed.

As illustrated in FIG. 20, the REN# signal has a logic "0" state when the read address enable signal RADEN is activated to logic "1" states during cycle QS-1, thereby indicating that a re-read operation should not be performed to queue QB. The RMUX3 signal transitions to a logic "0" value in response to the logic "0" state of the REN# signal and the logic "1" state of the RADEN signal. Consequently, the updated read count pointer provided by read counter 251 is routed as the RCNT3 value, and is written back to read FCR file 201 during write cycle QS2. Thus, the read queue pointer associated with queue QB is "updated" during cycles QS0-QS2. In addition, an updated (incremented) physical read address is written back to the read MAR file, overwriting the original physical read address associated with read queue QB.

The next time that a queue switch results in queue QB being accessed, the updated read queue pointer and updated physical read address are retrieved, and data is read starting at the updated physical read address associated with the updated read queue pointer. As a result, no re-read operation is performed.

If the present queue has not been marked for a re-read operation, then a logic high REN# signal and a logic high RADEN signal cannot signify a re-read operation. If this situation occurs, it is regarded as a no-read condition in cycle QS-1.

A same queue switch operation can be implemented in connection with the mark/re-write and mark/re-read operations. A same queue switch operation is defined as an operation wherein processing is "switched" from a queue to the same queue. The conditions of the same queue switch during a read operation are described below. Conditions are similar for a same queue switch during a write operation.

If the present queue is marked, a re-read operation is specified if the REN# signal is high during cycle QS-1, and data from the last updated read location will be output in cycle QS3. If the new queue is not marked (i.e., RADEN is low during cycle QS0), the marker is removed after cycle QS3 (i.e., the RMUX3 signal transitions to a logic "0" state). However, if the new queue is marked (i.e., RADEN is high during cycle QS0), then a mark is kept after cycle QS3 (i.e., the RMUX3 signal transitions to a logic "1" state). The condition where REN# is low during cycle QS-1 during a same queue switch (i.e., no re-read) is not allowed when the present queue is marked.

If the present queue is not marked and a same queue switch is initiated, the queue switch is ignored by the read logic 121. However, if the RADEN signal has a logic "1" state during cycle QS0, a mark is added to the present queue during cycle QS3.

In accordance with another embodiment of the present invention, multi-queue FIFO memory system 100 can be configured to operate in a packet mode. In the described embodiment, each packet has a minimum length of four words. Also in the described embodiment, each packet starts with a SOP (start of packet) marker/word, and ends with an EOP (end of packet) marker/word. A new status bit, hereinafter referred to as the packet status bit (PSB), is used to implement the packet mode. The packet status bit enables partial packet write and partial packet read operations, such that a queue switch can be performed in the middle of packet write or packet read operations. The packet status bit also enables data filtering to be performed between an activated EOP marker and a subsequently received SOP marker. Packet mark and re-write and packet mark and re-read operations are also enabled by the present embodiment.

Figure 21:
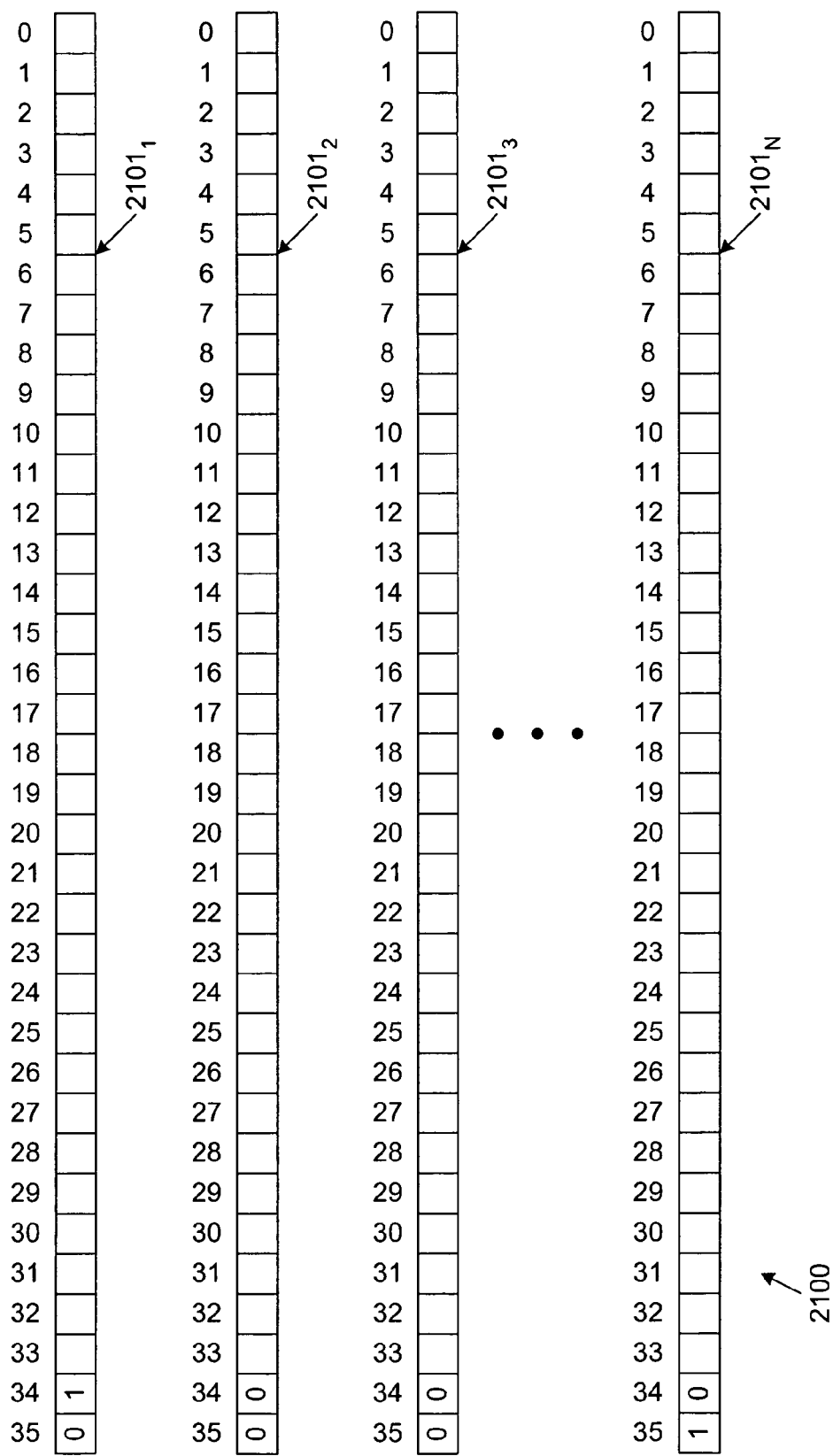
FIG. 21 is a block diagram illustrating a packet in accordance with one embodiment of the present invention.

FIG. 21 is a block diagram illustrating a packet 2100 in accordance with one embodiment of the present invention. Packet 2100 includes N words $2101_1$-$2101_N$, wherein N is greater than or equal to four. The variable N can have other values in other embodiments. The example of FIG. 21 assumes a read or write word width of 36-bits. Bit [34] of each of words $2101_1$-$2101_N$ is a start of packet (SOP) marker, and bit [35] of each of words $2101_1$-$2101_N$ is an end of packet (EOP) marker. Bit [34] of word $2101_1$ has a logic "1" value, thereby indicating that this word is the start of packet 2100. Bit [35] of word $2101_N$ has a logic "1" value, thereby indicating that this word is the end of packet 2100.

Although the present example uses a word width of 36-bits, it is understood that words of other widths can be used in other embodiments. For example, a word width of 18-bits can be used, wherein bit [17] of each word represents an EOP marker and bit [16] of each word represents an SOP marker. A word width of 9-bits can also be used, wherein bit [8] of each word represents an EOP or SOP marker. Appendix A provides more detail regarding possible EOP/SOP indicator locations for various bus matching conditions using 36-bit, 18-bit and 9-bit words. The particular bus matching condition implemented is identified by bus matching bits.

A re-write or re-read operation in packet mode is very similar to the re-write and re-read operations described above. However, instead of performing a re-write (or re-read) operation from the first location of a queue switch, a write (or read) packet mark pointer is updated every time a whole packet is written (or read). Thus, if a marked queue requests a re-write (or re-read) operation during a queue switch, only the previous packet is re-written (or re-read). After an end-of-packet (EOP) marker is received, the write (or read) packet mark pointer isn't updated until another valid write (or read) occurs, so the system has a way to control when to move the pointer.

Figure 22:
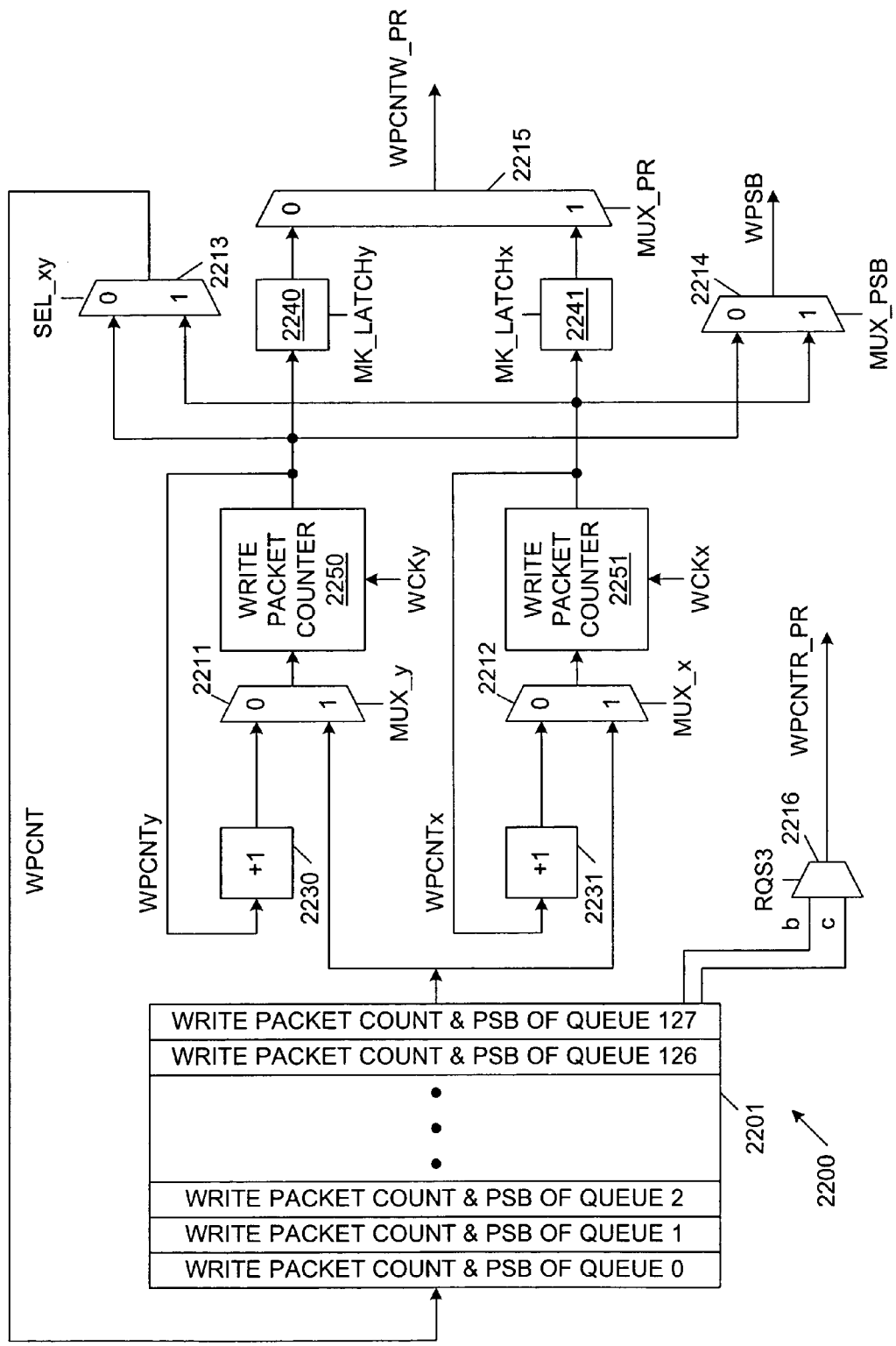
FIG. 22 is a block diagram of a write packet count register (PCR) system, which counts the number of packets written to each queue of multi-queue FIFO system, in accordance with one embodiment of the present invention.

FIG. 22 is a block diagram of a write packet count register (PCR) system 2200, which counts the number of packets written to each queue of multi-queue FIFO system 100, in accordance with one embodiment of the present invention. Write PCR system 2200 includes write PCR file 2201, multiplexers 2211-2216, adder circuits 2230-2231, write packet mark latches 2240-2241 and write packet counters 2250-2251.

Write PCR file 2201 includes 128 entries, one for each possible queue in system 100. Each entry stores a write packet count value and a write packet status bit for a corresponding queue. Each entry of write PCR file 2201 is coupled to the logic "1" input terminals of multiplexers 2211 and 2212 via a selection circuit (not shown). As described in more detail below, a new write packet count value is retrieved from write PCR file 2201 at the start of a packet write operation to a new queue (e.g., during write cycle QS3).

The output terminals of multiplexers 2211 and 2212 are coupled to packet write counters 2250 and 2251, respectively. The output terminal of packet write counter 2250 provides a write packet count value WPCNTy to adder circuit 2230, write packet mark latch 2240 and the "0" input terminals of multiplexers 2213-2214. Similarly, the output terminal of packet write counter 2251 provides a write packet count value WPCNTx to adder circuit 2231, write packet mark latch 2241 and the "1" input terminals of multiplexers 2213-2214. Write packet mark latches 2240 and 2241 are activated by the MK_LATCHy and MK_LATCHx signals, respectively. Adder circuits 2230 and 2231 each add one to the write packet count values provided by packet write counters 2250 and 2251, respectively. Adder circuits 2230 and 2231 apply the incremented write count values to the "0" input terminals of multiplexers 2211 and 2212, respectively. Write counters 2250 and 2251 latch the write packet count values provided by multiplexers 2211 and 2212 on rising edges of the WCKy and WCKx packet write clock signals, respectively. As described below, the packet write clock signals WCKx and WCKy are activated in response to activated SOP and EOP indicators.

In the described embodiment, multiplexers 2211-2216 are controlled by the control signals MUX_y, MUX_x, SEL_xy, MUX_PSB, MUX_PR and RQS3, respectively. Multiplexer 2213 provides an output signal WPCNT, which is written back to write packet count register file 2201, such that the write PCR file 2201 is updated to store changes in the write packet count and write packet status bit during each write cycle. Multiplexer 2214 provides the retrieved write packet status bit WPSB, which is used for data filtering (described below). Multiplexer 2215 provides a write-side write packet count value WPCNTW_PR, which is used to generate a packet ready signal associated with the active write queue. Multiplexer 2216 provides a read-side write packet count value WPCNTR_PR, which is used to generate a packet ready signal associated with the active read queue.

Write PCR file 2200 operates as follows when packet 2100 is written to FIFO 101. A packet write operation to a present queue is initiated in response to the WCLK, WEN#, WADEN and WADDR[7:0] signals in the manner described above. A write packet count value and a write packet status bit associated with the present queue are retrieved from write PCR file 2201 and applied to multiplexers 2211 and 2212. In the described embodiment, the write packet count value and the write packet status bit initially have zero values. The write packet status bit represents the least significant bit of write packet counter 2250, while the write packet count value represents the next significant bits of write packet counter 2250. The MUX_y signal has a logic "1" value, thereby routing the retrieved write packet count value and write packet status bit to write counter 2250. The write control logic 111 activates the WCKy, thereby latching the retrieved write packet count value and write packet status bit in write packet counter 2250. The MUX_y signal then transitions to a logic "0" state, thereby coupling the output of adder circuit 2230 to write packet counter 2250. The SEL_xy signal is controlled to have a logic "0" value, thereby routing the retrieved write packet count value and write packet status bit to the write PCR file 2201 as the WPCNT value. The MUX_PSB signal is also controlled to have a logic "0" value, thereby routing the retrieved write packet status bit as the signal WPSB.

The write control logic 111 subsequently detects the activated SOP marker at bit location [34] of the first word $2101_1$ of packet 2100. The MK_LATCHy signal is activated in response to this activated SOP indicator, thereby latching the initial write packet count value into write mark latch 2240. The MUX_PR signal has logic "0" value, thereby routing the contents of mark latch 2240 as the write packet counter value WPCNTW_PR. This write packet counter value WPCNTW_PR is compared with a read packet counter value RPCNTW_PR provided by a read PCR system 2300 (FIG. 23) to determine the status of a packet ready flag for the present write queue. This comparison is performed in write cycle WQS3.

The WCKy signal is also activated in response to the activated SOP marker, thereby latching the incremented value provided by adder circuit 2230 into write packet counter 2250. As a result, the least significant bit of write packet counter 2250 (i.e., the write packet status bit) is toggled to a logic "1" state. The retrieved write packet count value maintains its original state at this time.

Write PCR system 2200 remains in the above-described state while words $2101_1$-$2101_{N-1}$ of packet 2100 are written to the present queue PQ.

When the last word $2101_N$ of packet 2100 is written, the activated EOP marker at bit location [35] is detected by the write logic circuitry. The WCKy signal is activated in response to the activated EOP indicator, thereby latching the incremented value provided by adder circuit 2230 into write packet counter 2250. As a result, the least significant bit of write packet counter 2250 (i.e., the write packet status bit) is toggled to a logic "0" state, and the next least significant bit of write packet counter 2250 (i.e., the least significant bit of the write packet count value) is toggled to a logic "1" state. Consequently, when the complete packet 2100 has been written, the write packet count value is incremented by one, and the write packet status bit is returned to its original state. Thus, a write packet status bit having a value of "0" indicates that a complete packet has been written, while a write packet status bit having a value of "1" indicates that a partial packet has been written.

Processing may continue in the manner described above, thereby writing additional packets to the same queue. Upon receiving the next activated SOP marker, the MK_LATCHy signal is activated, thereby updating the write packet mark pointer stored in write packet mark latch 2240. The WCKy signal is also activated, thereby latching the incremented value provided by adder 2230.

In accordance with one embodiment of the present invention, the write control logic 111 does not permit any write operations to be performed while the WPSB bit has a logic "0" value. This effectively filters any words appearing between the activated EOP marker (i.e., the last word of one packet) and the next active SOP marker (i.e., the first word of the next packet). That is, dummy words appearing between an EOP marker and an SOP marker are subject to a filtering function on the write side. More specifically, after a completed packet has been written, if no SOP marker follows immediately after the EOP marker, the data is not written into the device even if the WEN# signal is active. When a new SOP marker is received, write operations are enabled again. As a result, the dummy data between an EOP marker and the next SOP marker is "filtered" out from the packet.

If the present queue has been marked (see, FIGS. 13-16) and the WEN# signal is pulled to a logic "1" state immediately after detecting an activated EOP marker, then the previously written packet is eligible for a re-write operation. The re-write operation may be performed to the same queue (or a different queue), by performing a queue switch. The previous packet is rewritten in the manner described above in FIGS. 13-16. In this case, the WCKy signal is not activated in response to the activated EOP marker, such that write packet counter 2250 is not incremented, and the associated write packet count value is not updated in write PCR file 2201. After the data packet 2100 has been successfully re-written, the WCKy signal is activated in response to the activated EOP marker (and logic low WEN# signal), thereby updating the write packet count value and write packet status bit.

A write queue switch in the packet mode will now be described. Prior to the start of write cycle QS-1, the write address enable signal WADEN transitions to a logic "1" state, thereby indicating that a queue switch (QS) will be performed from the present queue PQ to a new queue NQ. The address of the new queue NQ is identified by the write address signal WRADD[7:0]. The WADEN and WRADD[7:0] signals are detected at the beginning of write cycle QS-1 (at the rising edge of the WCLK signal).

In response to the detected WADEN signal, write PCR file 2201 retrieves the write packet count value and write packet status bit for the new queue identified by the WRADD[7:0] signal. The MUX_x signal is controlled to have a logic "1"

value, thereby routing the retrieved write packet count value and write packet status bit to write counter 2251. Data is written to the present queue during write cycles QS-1, QS0, QS1 and QS2 (assuming write data words are provided and the present queue is not full during these write cycles). If an activated EOP marker is detected before write cycle QS2, and there is no subsequent activated SOP marker, then a write packet status bit having a logic "0" value is written back to write PCR file 2201. The logic "0" state of the write packet status bit indicates that a full packet was written to the present queue. If no activated EOP marker is detected before write cycle QS2, then a write packet status bit having a logic "1" value is written back to write PCR file 2201. The logic "1" state of the write packet status bit indicates that a partial packet was written to the present queue. Note that the write packet counter value stored in write packet counter 2250 is also updated in write PCR file 2201.

The next time that a write operation is performed to the present write queue, the write packet status bit and the write packet counter value are retrieved from write PCR file 2201. The retrieved write packet status bit is used to determine whether to begin writing data values immediately (write packet status bit="1") to complete the previous partial packet write operation, or whether to filter the write data values until the next activated SOP marker is received (write packet status bit="0"). If the retrieved write packet status bit has a logic "1" value, the write packet counter 2250 is not advanced until an activated EOP marker is detected. Any activated SOP markers received before receiving an activated EOP marker are ignored.

During write cycle QS3, packet data is written to the new queue NQ in the manner described above. The new queue write packet count and write packet status bit are processed by write counter 2251, multiplexer 2212, adder circuit 2231 and mark latch 2241 in the same manner described above.

Figure 23:
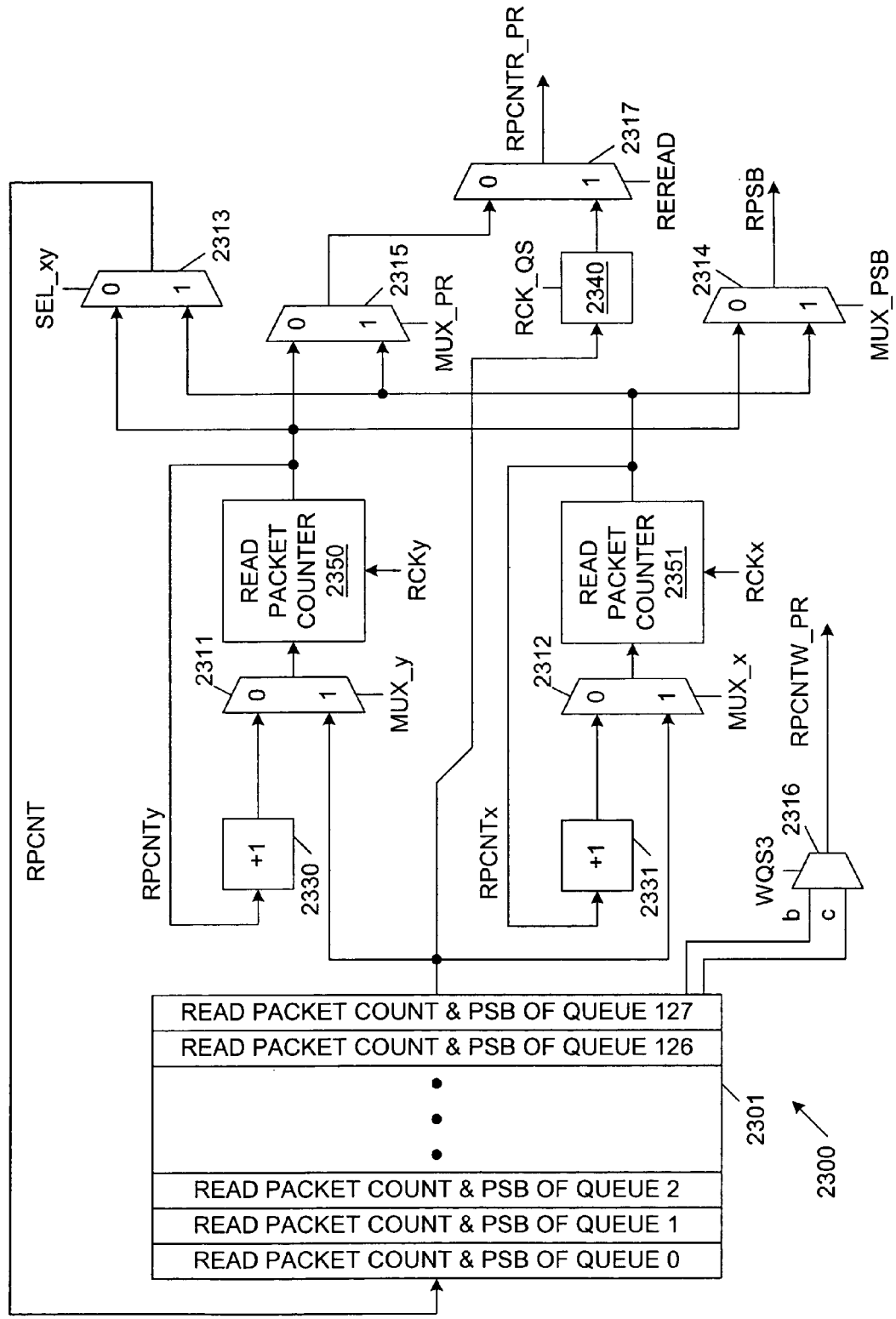
FIG. 23 is a block diagram of a read packet count register (PCR) system, which counts the number of packets read from each queue of multi-queue FIFO system, in accordance with one embodiment of the present invention.

FIG. 23 is a block diagram of a read packet count register (PCR) system 2300, which counts the number of packets read from each queue of multi-queue FIFO system 100, in accordance with one embodiment of the present invention. Read PCR system 2300 includes read PCR file 2301, multiplexers 2311-2317, adder circuits 2330-2331, read mark latch 2340 and read packet counters 2350-2351.

Read PCR file 2301 includes 128 entries, one for each possible queue in system 100. Each entry stores a read packet count value and a read packet status bit for a corresponding queue. Each entry of read PCR file 2301 is coupled to the logic "1" input terminals of multiplexers 2311 and 2312 and to read mark latch 2340 via a selection circuit (not shown). As described in more detail below, a new read packet count value is retrieved from read PCR file 2301 at the start of a read operation from a new queue.

The output terminals of multiplexers 2311 and 2312 are coupled to read packet counters 2350 and 2351, respectively. The output terminal of read packet counter 2350 provides a read packet count value RPCNTy to adder circuit 2330 and the "0" input terminals of multiplexers 2313-2314. Similarly, the output terminal of read packet counter 2351 provides a read packet count value RPCNTx to adder circuit 2331 and the "1" input terminals of multiplexers 2313-2314. Read mark latch 2340 is activated by the read queue switch clock signal RCK_QS. Adder circuits 2330 and 2331 each add one to the read packet count values provided by read packet counters 2350 and 2351, respectively. Adder circuits 2330 and 2331 apply the incremented read packet count values to the "0" input terminals of multiplexers 2311 and 2312, respectively. Read packet counters 2350 and 2351 latch the read packet count values provided by multiplexers 2311 and 2312 on rising edges of the RCKy and RCKx read packet clock signals, respectively. As described below, the read packet clock signals RCKx and RCKy are activated in response to activated SOP and EOP markers.

In the described embodiment, multiplexers 2311-2317 are controlled by the control signals MUX_y, MUX_x, SEL_xy, MUX_PSB, MUX_PR, RQS3 and REREAD, respectively. Multiplexer 2313 provides an output value RPCNT, which is written back to read PCR file 2301, such that the read PCR file 2301 is updated to store changes in the read packet count and read packet status bit during each read cycle. Multiplexer 2314 provides the retrieved read packet status bit, which is used for data filtering (described below). Multiplexer 2315 and read mark latch 2340 provide read packet count values to the "0" and "1" input terminals of multiplexer 2317, respectively. Multiplexer 2317 provides a read-side read packet count value RPCNTR_PR, which is used to generate the packet ready signal PR associated with the active read queue. Multiplexer 2316 provides a write-side read packet count value RPCNTW_PR, which is used to generate the packet ready signal PR associated with the active write queue (described above).

Read PCR system 2300 operates as follows when packet 2100 is read from FIFO 101. A packet read operation to a present queue is initiated in response to the RCLK, REN#, RADEN and RADDR[7:0] signals in the manner described above. A read packet count value and read packet status bit associated with the present queue are retrieved from read PCR file 2301 and applied to multiplexers 2311-2312 and read mark latch 2340. In the described embodiment, the read packet count value initially has a zero value, and the read packet status bit initially has a logic "1" value, wherein the read packet status bit represents the least significant bit of read packet counter 2350, and the read packet count value represents the next significant bits of read packet counter 2350. The MUX_y signal has a logic "1" value, thereby routing the retrieved read packet count value and read packet status bit to read packet counter 2350. The read control logic 121 activates the RCKy signal, thereby latching the retrieved read packet count value and read packet status bit into read packet counter 2350. The read control logic 121 also activates the RCK_QS signal, thereby latching the retrieved read packet count value into read mark latch 2340. The MUX_y signal then transitions to a logic "0" state, thereby coupling the output of adder circuit 2330 to read packet counter 2350. The SEL_xy signal is controlled to have a logic "0" value, thereby routing the retrieved read packet count value and read packet status bit back to the read PCR file 2301 as the RPCNT value. The MUX_PSB signal is also controlled to have a logic "0" value, thereby routing the retrieved read packet status bit as the read packet status bit RPSB.

The read logic circuitry subsequently detects the activated SOP marker at bit location [34] of the first word $2101_1$ of packet 2100. The MUX_PR and REREAD signals have logic "0" values, thereby routing the contents of read packet counter 2350 as the read packet counter value RPCNTR_PR. This read packet counter value RPCNTR_PR is compared with a write packet counter value WPCNTR_PR provided by a write PCR system 2200 (FIG. 22) to determine the status of a packet ready flag for the present read queue. This comparison is performed in read cycle QS3.

The RCKy signal is also activated in response to the activated SOP marker, thereby latching the incremented value provided by adder circuit 2330 into read packet counter 2350. As a result, the least significant bit of read packet counter 2350 (i.e., the read packet status bit) is toggled to a logic "0" state.

Read PCR system 2200 remains in the above-described state while words 2101₁-2101_{N-1} of packet 2100 are read from the present read queue.

When the last word 2101_N of packet 2100 is read, the activated EOP marker at bit location [35] is detected by the read logic circuitry. The RCKy signal is activated in response to the activated EOP marker, thereby latching the incremented value provided by adder circuit 2330 into read packet counter 2350. As a result, the least significant bit of read packet counter 2350 (i.e., the read packet status bit) is toggled to a logic "1" state, and the next least significant bit of read packet counter 2350 (i.e., the least significant bit of the read packet count value) is toggled to a logic "1" state. Consequently, when the complete packet 2100 has been read, the read packet count value is incremented by one, and the read packet status bit is returned to its original state. Thus, a read packet status bit having a value of "1" indicates that a complete packet has been read, while a read packet status bit having a value of "0" indicates that a partial packet has been read.

Processing may continue in the manner described above, thereby reading additional packets from the same read queue. Upon receiving the next SOP marker, the RCK_QS signal is activated, thereby updating the read count pointer value stored in read mark latch 2340. The RCKy signal is also activated, thereby latching the incremented value provided by adder 2330.

If the present queue has been marked (see, FIGS. 17-20) and the REN# signal is pulled to a logic "1" state immediately after detecting an activated EOP marker, then the previously read packet is eligible for a re-read operation. The REREAD control signal is activated to a logic "1" state, thereby routing the previously stored read packet count value through multiplexer 2317 as the RPCNTR_PR signal. The previous packet is re-read in the manner described above in FIGS. 17-20. In this case, the RCKy signal is not activated in response to the originally activated EOP marker, such that read packet counter 2350 is not incremented, and the associated read packet count value is not updated in read PCR file 2301. After the data packet 2100 has been successfully re-read, the RCKy signal is activated in response to the activated EOP marker (and logic low REN# signal), thereby updating the read packet count value and read packet status bit.

In the packet mode, a read queue switch is performed in the following manner. Prior to the start of read cycle QS-1, the read address enable signal RADEN transitions to a logic "1" state, thereby indicating that a queue switch (QS) will be performed from the present read queue PQ to a new read queue NQ. The address of the new queue NQ is identified by the read address signal RADD[7:0]. The RADEN and RADD[7:0] signals are detected at the beginning of read cycle QS-1 (at the rising edge of the RCLK signal).

In response to the detected RADEN signal, read PCR file 2301 retrieves the read packet count value and read packet status bit for the new queue identified by the RADD[7:0] signal. The MUX_x signal is controlled to have a logic "1" value, thereby routing the retrieved read packet count value and read packet status bit to read counter 2351. Data is read from the present queue during read cycles QS-1, QS0, QS1 and QS2 (assuming the read enable signal REN# remains activated low and the present queue is not empty during these read cycles).

If an activated EOP marker is detected before read cycle QS2, and there is no subsequent activated SOP marker, then a read packet status bit having a logic "1" value is written back to read PCR file 2301. The logic "1" state of the read packet status bit indicates that a full packet was written to the present queue. If no activated EOP indicator is detected before read cycle QS2, then a read packet status bit having a logic "0" value is written back to read PCR file 2301. The logic "0" state of the read packet status bit indicates that a partial packet was read from the present queue. Note that the read packet counter value stored in read packet counter 2350 is also updated in read PCR file 2301.

The next time that a read operation is performed to the present read queue, the read packet status bit and read packet count value are retrieved from read PCR file 2301. The retrieved read packet status bit is used to determine whether to begin read data values immediately (read packet status bit="0") to complete the previous partial packet read operation, or whether to filter the read data values until the next activated SOP marker is received (read packet status bit="1"). If the retrieved read packet status bit has a logic "0" value, the read packet counter 2350 is not advanced until an activated EOP marker is detected. Any activated SOP markers received before receiving an activated EOP marker are ignored.

During read cycle QS3, packet data is read from the new queue NQ in the manner described above. The new queue read packet count and read packet status bit are processed by read counter 2351, multiplexer 2312, adder circuit 2331 and mark latch 2340 in the same manner described above.

Although the invention has been described in connection with several embodiments, it is understood that this invention is not limited to the embodiments disclosed, but is capable of various modifications, which would be apparent to one of ordinary skill in the art. Thus, the present invention is only intended to be limited by the following claims.

36->36

35 34                                                                    0

Bit 34 is SOP, bit 35 is EOP, bit 33 is AEOP

- Minimum allowable packet size of four writes (of the largest width).
- Maximum allowable packet size is the depth of the queue
- The packet logic expects a SOP marker to be followed by an EOP marker.
- SOP and EOP can't be "1" in the same word. (x36 or x18)
- Dummy words between EOP and SOP can be read out before SOP.

9->9

8           0

A  ← Check bit 8 for SOP/EOP

B  ← Check bit 8 for EOP/SOP

C  ← Check bit 8 for SOP/EOP

D  ← Check bit 8 for EOP/SOP

9->18

17 16                    0

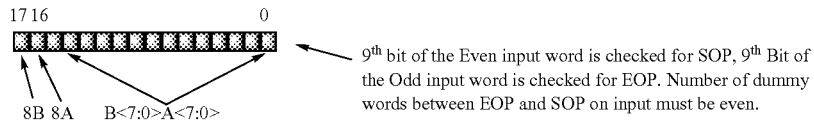

8B 8A    B<7:0>A<7:0>

9th bit of the Even input word is checked for SOP, 9th Bit of the Odd input word is checked for EOP. Number of dummy words between EOP and SOP on input must be even.

17 16                    0

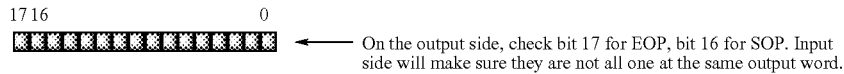

On the output side, check bit 17 for EOP, bit 16 for SOP. Input side will make sure they are not all one at the same output word.

35 34 33 32                                      0

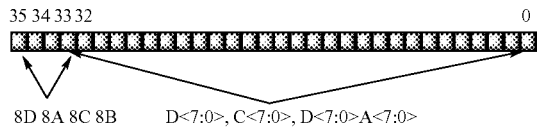

8D 8A 8C 8B    D<7:0>, C<7:0>, D<7:0>A<7:0>

9th bit of every first input word is checked for SOP, 9th Bit of every fourth input word is checked for EOP.

35 34 33 32                                      0

On the output side, check bit 35 for EOP, bit 34 for SOP. Input side will make sure they are not all one at the same output word.

18->18

17 16                    0

E 

Check bit 16 for SOP, Bit 17 for EOP 17 16                    0

F 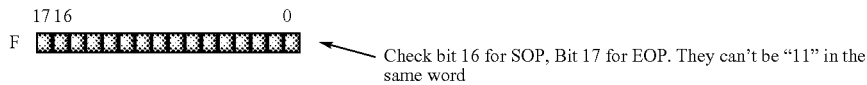

Check bit 16 for SOP, Bit 17 for EOP. They can't be "11" in the same word 35 34 33 32                                      0

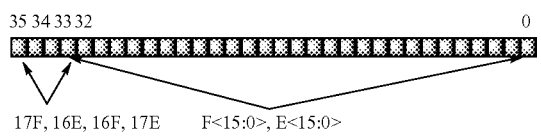

17F, 16E, 16F, 17E    F<15:0>, E<15:0>

17th bit of every Even input word is checked for SOP, 18th Bit of every Odd input word is checked for EOP.

35 34 33 32                                      0

On the output side, check bit 35 for EOP, bit 34 for SOP. Input side will make sure they are not all one at the same output word.

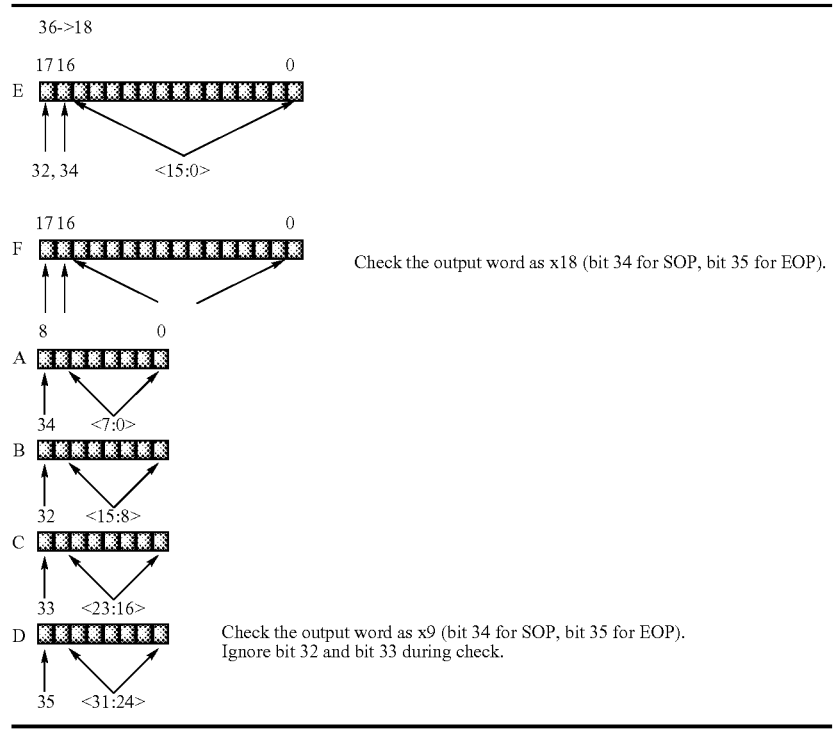

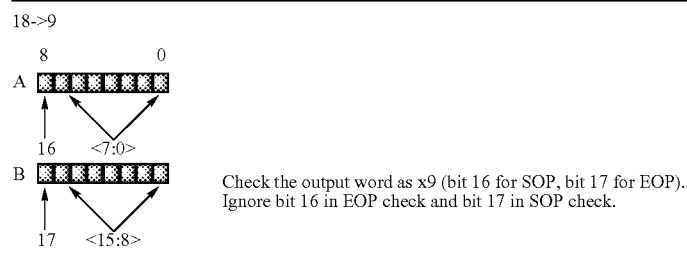

We claim:

1. A method of operating a multi-queue device, comprising:
   initiating a write operation to a first queue;
   detecting a start-of-packet indicator in write data associated with the write operation, and in response, setting a write packet status bit to a first state and writing data to the first queue; then
   interrupting the write operation; then
   resuming the write operation;
   detecting that the write packet status bit is in the first state upon resuming the write operation, and in response, writing data to the first queue; and
   preventing data from being written to the first queue while the write packet status bit is not in the first state.

2. The method of claim 1, further comprising detecting an end-of-packet indicator in write data associated with the write operation, and in response, changing the state of the write packet status bit from the first state to a second state.

3. The method of claim 1, wherein the step of interrupting the write operation comprises performing a first queue switch, wherein data is written to a second queue in response to the first queue switch.

4. A method of operating a multi-queue device, comprising:
   initiating a write operation to a first queue, wherein the step of initiating a write operation to the first queue comprises retrieving a write packet status bit from a register;
   detecting a start-of-packet indicator in write data associated with the write operation, and in response, setting the write packet status bit to a first state and writing data to the first queue; then
   interrupting the write operation, wherein the step of interrupting the write operation comprises returning the write packet status bit to the register; then
   resuming the write operation, wherein the step of resuming the write operation comprises retrieving the write packet status bit from the register; and
   detecting that the write packet status bit is in the first state upon resuming the write operation, and in response, writing data to the first queue.

5. The method of claim 3, wherein the step of resuming the write operation comprises performing a second queue switch, from the second queue to the first queue.

* * * * *